United States Patent [19]

Krishnamurthy et al.

[11] Patent Number: 5,234,472
[45] Date of Patent: Aug. 10, 1993

[54] SEPARATION OF GAS MIXTURES INCLUDING HYDROGEN

[75] Inventors: Ramachandran Krishnamurthy, Piscataway; Steven L. Lerner, Berkeley Heights; Yagya Shukla, Roselle Park, all of N.J.; Alan G. Stokley, Wokingham, England

[73] Assignee: The BOC Group plc, Surrey, England

[21] Appl. No.: 849,261

[22] Filed: Mar. 11, 1992

Related U.S. Application Data

[62] Division of Ser. No. 270,927, Nov. 14, 1988, Pat. No. 5,112,590.

[51] Int. Cl.$^5$ .............................................. B01D 53/04
[52] U.S. Cl. .......................................... 95/98; 95/140; 95/139; 95/116; 95/127; 95/143
[58] Field of Search .................. 55/25, 26, 31, 33, 58, 55/62, 68, 74, 75, 161–163, 179, 387, 389

[56] References Cited

U.S. PATENT DOCUMENTS

| Re. 31,014 | 8/1982 | Sircar | 55/26 |
|---|---|---|---|
| 3,102,013 | 8/1963 | Skarstrom | 55/31 |
| 3,252,268 | 5/1966 | Stark | 55/25 |
| 3,430,418 | 3/1969 | Wagner | 55/62 X |
| 3,720,042 | 3/1973 | Simonet | 55/25 |
| 3,923,477 | 12/1975 | Armond et al. | 55/25 |
| 4,171,207 | 10/1979 | Sircar | 55/26 |
| 4,299,596 | 11/1981 | Benkmann | 55/26 |
| 4,640,694 | 2/1987 | Leitgeb et al. | 55/26 |
| 4,696,680 | 9/1987 | Ghate et al. | 55/25 |
| 4,726,816 | 2/1988 | Fuderer | 55/26 |
| 4,732,577 | 3/1988 | Koizumi et al. | 55/25 X |
| 4,790,858 | 12/1988 | Sircar | 55/26 |
| 4,836,833 | 6/1989 | Nicholas et al. | 55/26 X |
| 4,846,851 | 7/1989 | Guro et al. | 55/26 |
| 4,913,709 | 4/1990 | Kumar | 55/26 |
| 4,914,218 | 4/1990 | Kumar et al. | 55/26 |
| 4,963,339 | 10/1990 | Krishnamurthy et al. | 55/26 X |
| 5,042,995 | 8/1991 | Mitariten | 55/31 X |
| 5,096,470 | 3/1992 | Krishnamurthy | 55/26 |
| 5,106,396 | 4/1992 | Mitariten | 55/26 |
| 5,112,590 | 5/1992 | Krishnamurthy et al. | 423/415 A |

Primary Examiner—Robert Spitzer
Attorney, Agent, or Firm—Coleman R. Reap; Larry R. Cassett

[57] ABSTRACT

A process for separation of a gas mixture containing three components, e.g. a mixture comprising hydrogen, carbon monoxide and carbon dioxide produced by steam reforming a hydrocarbon, by pressure swing adsorption is disclosed. In one embodiment of the process, the gas mixture is sequentially passed through first and second adsorptive regions each of which adsorbs a second component more strongly than a first component but less strongly than a third component, a first fraction enriched in the first component is withdrawn from the downstream end of the second region, introduction of gas mixture to the first region is stopped and the second region is closed to the first region, a second fraction enriched in the second component is withdrawn first from the upstream end of the second adsorptive region while passing gas mixture enriched in the third component into the first region from its upstream end and then from the downstream end of the first region, and withdrawing a third fraction enriched in the third component from the upstream end of the first region. The separation process is also applicable to other gas mixtures such as a mixture of hydrogen, argon, methane and nitrogen commonly available as ammonia plant purge gas from which ammonia has been removed.

8 Claims, 6 Drawing Sheets

SEPARATION OF GAS MIXTURES INCLUDING HYDROGEN

This is a division of application Ser. No. 07/270,927, filed Nov. 14, 1988 now U.S. Pat. No. 5,112,590.

This invention relates to the separation of gas mixtures including hydrogen. It is particularly concerned with the separation of gas mixtures including hydrogen that are formed by reforming hydrocarbons with steam.

BACKGROUND OF THE INVENTION

The reaction between hydrocarbon and steam produces a gas mixture comprising hydrogen, carbon monoxide, carbon dioxide and water vapor as well as typically some residual methane. Various processes are known for separating pure product from such mixtures. Some processes include an initial so-called shift reaction in which the carbon monoxide is converted to carbon dioxide. Such processes are unsuitable when carbon monoxide is desired as a product. These and other processes frequently employ cryogenic distillation in order to effect separation between hydrogen and the other constituents of the mixture after removal of carbon dioxide. However, cryogenic separation processes tend to have a high capital cost, particularly if more than one pure product is required.

The separation of hydrogen-rich gas mixtures, i.e. containing more than 50% by volume of hydrogen, by pressure swing adsorption (PSA) for separating hydrogen-rich gas mixtures is also well known. One such PSA cycle is disclosed in U.S. Pat. No. 3,430,418. In the cycle disclosed therein, the hydrogen-rich gas mixture is separated into hydrogen product and a waste gas stream. Many commercially practiced PSA processes utilize a similar cycle. They all have in common the feature of separating the incoming gas mixture into a hydrogen product stream and a single vent gas stream. The vent gas stream is, however, generally unsuitable for the production of carbon monoxide as its carbon monoxide content is relatively low.

A more elaborate PSA cycle for separating a gas mixture rich in hydrogen is described in European patent application 8882 A. The disclosed cycles are stated to be suitable for recovering separate hydrogen and methane products from a gas mixture comprising hydrogen, methane, and $C_2$ or higher hydrocarbons. There is no suggestion of using the cycle to separate hydrogen and carbon monoxide products from a gas mixture comprising hydrogen, carbon monoxide and carbon dioxide, and hence there is no suggestion as to how the process might be integrated into a plant using a steam reformer to produce hydrogen and carbon monoxide products.

Another proposal for separating gas mixtures comprising hydrogen and two other components is disclosed in International patent application WO 86/05414. An example is given in this patent application of the separation of gas mixtures rich in hydrogen and carbon monoxide and with relatively low proportions of carbon dioxide (e.g. 1.5% by volume). There is no disclosure as to how such a process might be integrated into a plant for reforming hydrocarbon by reaction with steam. Moreover, the carbon dioxide concentrations from such a reformer are generally considerably higher than 1.5% by volume. In addition, the disclosed process withdraws both hydrogen and carbon monoxide-enriched gas from the same location. In practice, this makes it difficult to obtain a high purity hydrogen product.

There is thus a need for a noncryogenic method which makes possible the efficient production of relatively pure hydrogen and carbon monoxide products from a gas mixture formed by reforming hydrocarbon with steam. Such a need is not met by a process described in German patent application 3 427 804 A1 which discloses reforming hydrocarbon with carbon dioxide and then separating the resultant mixture into separate streams comprising carbon monoxide, hydrogen and carbon dioxide, but discloses no specific means for effecting this separation.

SUMMARY OF THE INVENTION

According to the present invention, there is provided a method and apparatus for forming hydrogen and carbon monoxide products from hydrocarbon, comprising reforming hydrocarbon to form a gas mixture including hydrogen, carbon monoxide, and carbon dioxide, subjecting the gas mixture to at least one sorptive separation to produce hydrogen product, a gas mixture enriched in carbon monoxide, and a gas mixture enriched in carbon dioxide, and then subjecting at least some of the latter gas mixture to further sorptive separation to produce carbon monoxide product, wherein the hydrocarbon is reformed with steam and at least some of the gas mixture enriched in carbon dioxide or carbon dioxide provided from a separate source.

At least some of the gas mixture enriched in carbon dioxide is utilized to reform the hydrocarbon thereby increasing the proportion of carbon monoxide in the gas mixture leaving the reformer and increasing the rate of production thereof. Preferably, the sorptive separation steps comprise separation by PSA. Thus, the separation of the gas mixture comprising hydrogen, carbon monoxide and carbon dioxide into hydrogen product, a gas mixture enriched in carbon monoxide, and a gas mixture enriched in carbon dioxide is performed by repeating a cycle of operations including passing said gaseous mixture through first and second adsorptive regions in series, both said adsorptive regions comprising adsorbent on which carbon monoxide is more readily adsorbed than hydrogen but less readily adsorbed than carbon dioxide, withdrawing hydrogen product from the downstream end of said second region, stopping introduction of the gas mixture to the first adsorptive region, withdrawing a gas mixture enriched in carbon monoxide from both adsorbent regions at a location intermediate said first and second adsorbent regions, and then withdrawing a gas mixture enriched in carbon dioxide from the feed end of the first adsorbent region.

By taking these gas mixtures enriched, respectively, in carbon monoxide and carbon dioxide from different positions relative to the adsorbent it is possible to enhance the carbon monoxide content of the gas mixture enriched in carbon monoxide. Moreover, by withdrawing the gas mixture enriched in carbon monoxide from both adsorptive regions, the final yield of carbon monoxide is greater than if the gas mixture enriched in carbon monoxide were taken from just one of the adsorptive regions.

In a broader sense, the present invention utilizes PSA to separate gas mixtures comprising at least three components. A first method comprises repeatedly performing a cycle of operations including passing said gas mixture successively through first and second adsorptive regions each containing an adsorbent on which a second component is more strongly adsorbed than a first component and less strongly adsorbed than a third component, withdrawing a first fraction enriched in the first component from the downstream end of the second region, stopping introduction of the gas mixture to the first adsorptive region, withdrawing a second fraction enriched in the second component simultaneously from the downstream end of the first adsorptive region and from the upstream end of the second adsorptive region into a common pipeline, and, finally, withdrawing a third fraction enriched in the third component from the upstream end of the first adsorptive region.

An alternate method comprises repeatedly performing a cycle of operations including passing the gas mixture through the first and second adsorptive regions, withdrawing a first fraction enriched in the first component from the downstream end of the second region, stopping introduction of the gas mixture to the first adsorptive region and closing the second adsorptive region to the first adsorptive region, withdrawing a second fraction enriched in the second component first from the upstream end of the second adsorptive region while passing gas mixture enriched in the third component into said first adsorptive region, through its upstream end, and then, from the downstream end of the first adsorptive region, and, finally, withdrawing a third fraction enriched in the third component from the downstream end of the first adsorptive region. Both of these methods above may also include: equalizing the pressure in the first and second adsorptive regions with the pressures in another pair of first and second adsorptive regions at low pressure intermediate the steps of producing the gas mixtures enriched in the first component and the gas mixture enriched in the second component; purging the first and second adsorptive regions with gas enriched in the first component after withdrawal of the gas enriched in the third component; equalization of pressures between the first and second adsorptive regions and another pair of first and second adsorptive regions at high pressure to build-up pressure to a first level after purging the first and second adsorptive regions; and pressurizing the first and second adsorptive regions to the second level with gas mixture enriched in the first component.

DETAILED DESCRIPTION OF THE INVENTION

Figure 1:
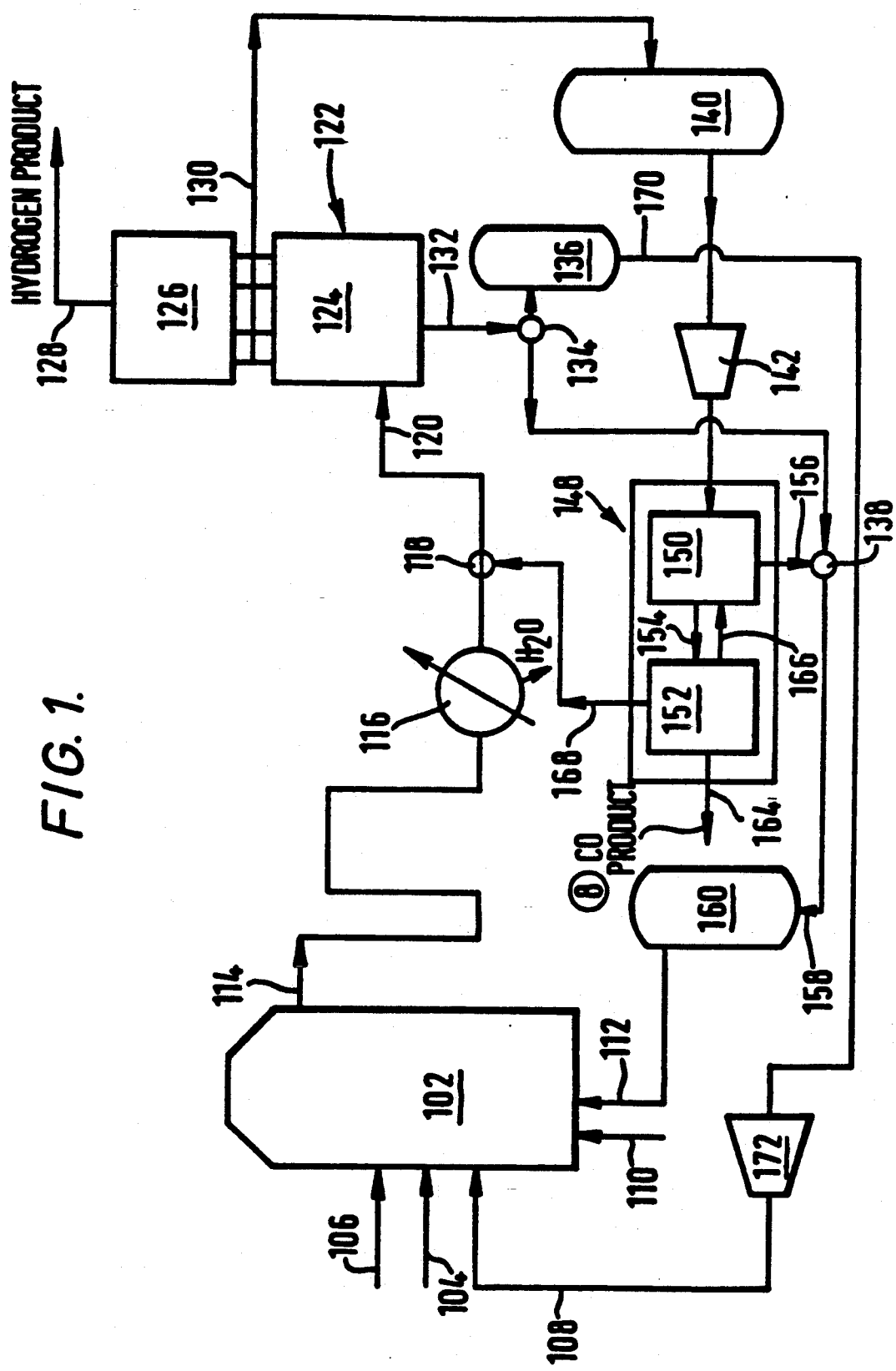
FIG. 1 is a schematic diagram illustrating apparatus for producing carbon monoxide and hydrogen products including a reformer, a PSA unit for producing hydrogen, and a PSA unit for producing carbon monoxide.

Referring to FIG. 1, the illustrated apparatus includes a reformer 102 in which hydrocarbon introduced through inlet 104 is reacted with steam introduced through inlet 106 and the carbon dioxide content of a recycled carbon dioxide-enriched gas stream introduced through inlet 108. The hydrocarbon typically is butane, though other lower alkanes may be used instead. Butane will rapidly and irreversibly react with steam and carbon dioxide to form carbon monoxide, hydrogen and methane which reacts in the same manner to produce additional carbon monoxide and hydrogen.

The following chemical equilibria are set up:

| | |
|---|---|
| $CH_4 + H_2O$ | $CO + 3H_2$ |
| $CH_4 + CO_2$ | $2CO + 2H_2$ |
| $CO + H_2O$ | $CO_2 + H_2$ |

It can thus be appreciated that recycling the carbon dioxide-enriched gas mixture to the reformer 102 enhances the carbon monoxide content of the gas mixture produced thereby. Preferably, the rate of recycle will produce a carbon monoxide content of the gas mixture exiting the reformer 102 of from 14 to 20 mole per cent, excluding water.

Preferably, not all the gas mixture enriched in carbon dioxide is employed to reform hydrocarbon even in the event it is not otherwise used in the process, e.g., to displace carbon monoxide from the first adsorptive region prior to production of gas mixture enriched in carbon monoxide from such region as described hereinafter. In addition, it is preferred that some of the gas mixture enriched in carbon dioxide is employed as fuel in the reformer. Such gas mixture enriched in carbon dioxide will meet only a portion of the requirements for fuel of the reformer, and typically a portion of the hydrocarbon feed to the reformer is also used as fuel.

The resulting gas mixture comprising hydrogen, carbon monoxide, carbon dioxide, steam and unreacted methane leaves the reformer 102 through an outlet 114 at close to the operating temperature and pressure of the reformer 102. Typically, the reformer is operated at elevated pressure, for example, in the range 10 to 20 atmospheres absolute and at a temperature between about 700° to 900° C. Since the reactions of the hydrocarbon with carbon dioxide and with steam are endothermic, it is necessary to provide heat to the reformer by burning hydrocarbon fuel introduced through inlet 110. In addition, recycled waste gas from a downstream stage of the process is introduced into the reformer 102 through inlet 112 and combusted.

The gas mixture comprising hydrogen, carbon monoxide, carbon dioxide methane and steam exiting the reformer 102 through line 114 is cooled to approximately ambient temperature in cooler 116, thereby being condensed. Cooler 116 separates condensed water from the gas mixture to form a saturated gas mixture comprising hydrogen, carbon monoxide, carbon dioxide and methane. The gas mixture is united in mixer 118, which if desired may merely be a union of two pipes, with another hydrogen-rich gas stream from a downstream stage of the process.

The resulting gas mixture, typically comprising 50 to 80 mole per cent of hydrogen; 8 to 20 mole per cent of carbon monoxide; 10 to 30 mole per cent of carbon dioxide; and up to 3 mole per cent of methane, is subjected to sorptive separation, preferably in a PSA unit, to produce a hydrogen product, a gas mixture enriched in carbon dioxide, and a gas mixture enriched in carbon monoxide. The gas mixture enters a PSA unit 122 through inlet 120. The PSA unit 122 comprises a first array of adsorber vessels 124 in series with a second array of adsorber vessels 126 and has an outlet 128 for hydrogen product, an outlet 130 intermediate of the arrays of beds 124 and 126 for gas mixture enriched in carbon monoxide and an outlet 132 for gas mixture enriched in carbon dioxide. The adsorbent in both beds preferentially adsorbs in the order carbon dioxide, carbon monoxide and hydrogen. Suitable PSA units and their operation are to be described below with reference to FIGS. 2 and 3.

The outlet 132 communicates with a device 134, which may be a simple T-junction, for dividing the carbon dioxide-enriched gas mixture withdrawn from PSA unit 122 into two streams. A first stream passes to a tank 136 while the other stream passes to a mixer 138 (which may, if desired, be a simple union of pipes) wherein it is mixed with another carbon dioxide-rich gas stream from a downstream stage of the process. The resulting mixture is passed through an inlet 158 into a gas storage tank 160 to be used as the source of the recycled fuel introduced into the reformer 102 through the inlet 112. Since the carbon dioxide-rich gas stream also contains a significant amount of hydrogen and some carbon monoxide, it is readily combustible. The carbon dioxide-enriched gas mixture is passed continuously out of storage tank 136 through an outlet 170 to a compressor 172 that raises the pressure thereof to the operating pressure of the reformer 102 and then introduces it thereto through the inlet 108.

The gas mixture enriched in carbon monoxide that exits the PSA unit 122 through the outlet 130 is collected in a storage tank 140. The gas mixture is continuously withdrawn therefrom to compressor 142 to raise the pressure thereof preferably to about one atmosphere in excess of the pressure of the gas entering the PSA unit 122. This separation is carried out in PSA unit 148 which comprises a first stage 150 and a second stage 152.

A further sorptive separation step in which the gas mixture enriched in carbon monoxide is separated to yield a carbon monoxide product is preferably performed in two stages. First, constituents of the gas mixture more readily adsorbable than carbon monoxide are separated therefrom producing a gas mixture comprising hydrogen and carbon monoxide. Second, the resulting gas mixture is separated to form carbon monoxide product and a gas mixture rich in hydrogen which is mixed with the gas mixture comprising hydrogen, carbon monoxide, and carbon dioxide that exits the reformer. Both separations are preferably performed by PSA. In a preferred embodiment, a portion of the hydrogen-rich gas produced in the second stage is recycled to the first stage as purge gas, and at least part of the gas vented from the first stage is collected and used as fuel in the reformer. A second portion of the gas vented from the first phase is preferably recycled to the incoming gas mixture. Since in the second stage carbon monoxide is more readily adsorbed than hydrogen, product is taken by desorption of the adsorbent. Therefore, it is preferred to effect desorption below atmospheric pressure to ensure a good yield.

In the first stage 150, constituents of the gas mixture more readily adsorbable than carbon monoxide are adsorbed thereby producing a gas mixture consisting essentially of hydrogen and carbon monoxide which passes out through conduit 154 into the second stage 152 for further separation. The adsorbed gases are desorbed and vented from the first stage 150 through an outlet 156 and are then mixed in the mixing device 138 as aforesaid, with a part of the carbon dioxide-enriched gas mixture from the PSA unit 122.

In the second stage 152 of the PSA unit 148, carbon monoxide is adsorbed from the gas mixture to produce a gas mixture rich in hydrogen. A part of the hydrogen-rich gas mixture is withdrawn through outlet 168 and mixed with the reformed gas mixture in mixing device 118. The remainder of the hydrogen-rich gas mixture is returned through conduit 166 to the first stage 150 of PSA unit 148 as a purge to desorb gases from the adsorbent. In order to produce a relatively pure carbon monoxide product, carbon monoxide adsorbed in second stage 152 is preferably desorbed therefrom by being subjected to sub-atmospheric pressure, e.g. by a vacuum pump (not shown in FIG. 1) and is withdrawn from PSA unit 148 through outlet 164. Typically, the carbon monoxide product contains less than 200 volumes per million of methane, less than 10 volumes per million of carbon dioxide and less than 1500 volumes per million of hydrogen. Moreover, hydrogen may be produced in accordance with the present invention in such purity that it contains less than one volume per million of carbon monoxide.

Figure 2:
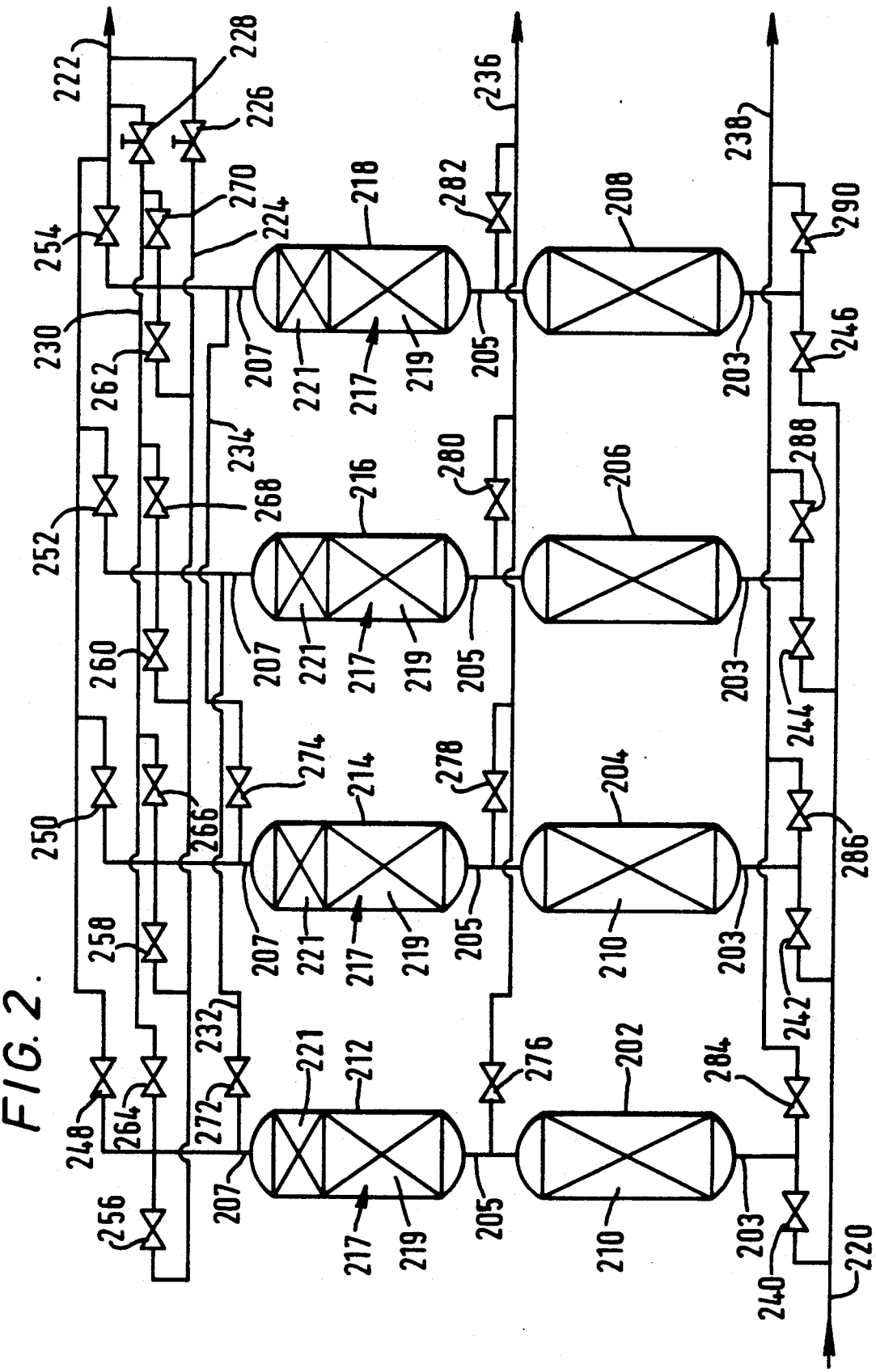
FIG. 2 is a schematic diagram illustrating PSA apparatus for producing hydrogen product said apparatus being suitable for use in the apparatus shown in FIG. 1.

A plant apparatus as shown in FIG. 1 is capable of producing carbon monoxide in relatively high yield in comparison with known noncryogenic processes. This is mainly the result of employing the PSA unit 122 to produce three fractions, i.e., hydrogen product, a carbon monoxide-enriched gas mixture and a carbon-dioxide enriched gas mixture. Any desired carbon monoxide product purity can be achieved in accordance with the subject process. There is, however, a trade-off between the specified purity and the resulting yield of carbon monoxide. One embodiment of a PSA unit suitable for producing three fractions from a hydrocarbon reformer 102 effluent is shown in FIG. 2 of the accompanying drawings.

The present invention provides a means of improving the overall efficiency of a PSA separation of a multicomponent gas mixture wherein the effluent from the adsorbent bed continuously changes in concentration either during the production step or the depressurization step. In the subject method, the mixture is collected in two fractions, one enriched in a desired product and the other enriched in an impurity. The multicomponent gas mixture can be the depressurization stream from an adsorbent bed that comprises hydrogen, carbon monoxide and carbon dioxide, a mixture comprising hydrogen and argon recovered as product gas from an adsorbent bed used to separate them from a mixture also including methane and nitrogen, and the like. In the latter mixture, the initial fraction is hydrogen rich and would be utilized, for example, to provide regeneration gas for the adsorbers, while the second fraction is an argon-enriched desired product. Utilization of the subject method in this instance reduces the hydrogen concentration of the argon-enriched fraction which is purified further to pure argon and, therefore, helps to reduce the cost of the overall process for producing argon from the feed gas mixture.

Typically, the PSA unit 122 in FIG. 1 will contain at least two, preferably at least four, pairs of adsorber vessels making up arrays 124 and 126, each pair performing the cycle of operations in chosen phase relationship to the others. Typically, intermediate the steps of producing the hydrogen product and the gas mixture enriched in carbon monoxide, the pressures in a pair of beds, one from each of arrays 124 and 126, are equalized with the pressures in another pair of beds. Further, after the step of producing the gas mixture enriched in carbon dioxide, a pair of beds from each of arrays 124 and 126 is preferably placed in communication with another pair of beds at a higher pressure so as to build-up the pressure to a first level, and then the pressure is increased again by repressurizing the beds with product hydrogen.

The gaseous mixture enriched in carbon monoxide may be withdrawn from both of arrays of beds 124 and 126 simultaneously. Alternatively, the gas mixture enriched in carbon monoxide is withdrawn first from said second array 126 and then from said first array 124. This procedure enables a bed in said first adsorptive region to have introduced into it from its feed end a portion of said gas mixture enriched in carbon dioxide from another pair of beds in arrays 124 and 126 while the corresponding bed in the second array 126 is producing the gas mixture enriched in carbon monoxide. Since the ratio of carbon dioxide to hydrogen or carbon monoxide is higher in the gas mixture enriched in carbon dioxide than it is in the feed gas mixture, admission of a portion of the gas mixture enriched in carbon dioxide to a bed in first array 124 while the corresponding bed in second array 126 is producing gas mixture enriched in carbon monoxide helps to displace hydrogen and carbon monoxide away from the feed end of the first bed towards the intermediate location. Accordingly, when it is the turn of the bed in the first array 124 to produce gas mixture enriched in carbon monoxide, there is a greater concentration of carbon monoxide in the unadsorbed gas immediately adjacent the said intermediate location and, thus, the proportion of carbon monoxide in the gas mixture withdrawn from that location is enhanced. The presence of two adsorptive regions and the withdrawal of carbon monoxide-rich gas mixture from an intermediate location is the most effective use of the carbon dioxide-rich gas mixture in terms of displacing carbon monoxide. Allowing time for carbon monoxide displacement after admitting the carbon dioxide rich mixture enhances the displacement thereby, producing a very high recovery of carbon monoxide.

The operation of PSA unit 122 in FIG. 1 as described above is seen in more detail with reference to FIG. 2. In FIG. 2, four adsorber vessels 202, 204, 206 and 208 of equal volume are connected in parallel to a feed gas inlet pipeline 220 which is intended for connection to conduit 120 shown in FIG. 1. Each vessel contains a bed 210 of activated carbon adsorbent and has at its bottom, a gas port 203 able to be selectively placed in communication with the feed pipeline 220 and with a vent gas pipeline 238 for the withdrawal of carbon-dioxide enriched gas mixture, and at its top a connecting conduit 205. The connecting conduits 205 provide through paths from the tops of the vessels to, respectively, the bottoms of adsorbent vessels 212, 214, 216 and 218. Each of the latter adsorber vessels contains a bed 217 of adsorbent comprising a lower layer 219 of activated carbon adsorbent and an upper layer 221 of zeolite molecular sieve adsorbent. Each of said vessels has at its top a gas port 207 able to be placed selectively in communication with a hydrogen product pipeline 222, a purge gas pipeline 224 having a purge gas flow control valve 226 disposed therein, and a repressurization gas pipeline 230 having a flow control valve 228 disposed therein. The purge gas and repressurization pipelines both communicate with the hydrogen product pipeline 222 so that the adsorber vessels can be purified and repressurized with product hydrogen. In addition, the tops of the vessels 212 and 216 are interconnected by the pressure equalization conduit 232, and the tops of the vessels 214 and 218 are similarly interconnected by a pressure equalization conduit 234. The PSA unit shown in FIG. 2 also includes an outlet pipeline 236 for carbon monoxide-enriched gas mixture which is connected to the conduits 205.

The flow paths taken by gas in operation of the unit shown in FIG. 2 are determined by the positions of a number of switching valves. Thus, switching valves 240, 242, 244 and 246 determine which of the vessels 202, 204, 206 and 208 is placed in communication with the feed pipeline 220; four switching valves 248, 250, 252 and 254 determine which of the vessels 212, 214, 216 and 218 supplies product gas to the hydrogen product pipeline 222; purge gas valves 256, 258, 260 and 262 select which of the vessels 212, 214, 216 and 218 receives purge gas comprising product hydrogen; and switching valves 264, 266, 268 and 270 determine which of the vessels 212, 214, 216 and 218 is repressurized with hydrogen product gas from the pipeline 228. There are also switching valves 272 and 274 which determine whether the members of the respective pairs of vessels 212 and 216, and 214 and 218, are placed in communication to equalize the gas pressures therebetween. Further, switching valves 276, 278, 280 and 282 determine which of the vessels supplies carbon monoxide-enriched gas mixture to the pipeline 236 and switching valves 284, 286, 288 and 290 determine which of the vessels supplies carbon dioxide-enriched gas mixture to the pipeline 238.

As is well known in PSA technology, all of the switching valves may be controlled automatically on a predetermined schedule. Each of the pairs of vessels 202 and 212, 204 and 214, 206 and 216, and 208 and 218 is used to separate the incoming reformer gas mixture in accordance with a cycle of operation which will be described with reference to the vessels 202 and 212. An incoming gas mixture typically comprising, by volume, 50–80% of hydrogen, 8–20% of carbon monoxide, 0–3% of methane, 10–30% of carbon dioxide and saturated in water vapor, is passed into the vessel 202 at a pressure preferably from about 125–400 psig. Since carbon dioxide and water vapor are more strongly adsorbed on the activated carbon adsorbent in the bed 210 than carbon monoxide and methane, the gas mixture becomes progressively enriched in hydrogen as it flows through the adsorbent bed. The gas mixture then flows into the vessel 212 and further adsorption takes place in the layer of activated carbon 217 therein. The gas is predominantly hydrogen as it enters the upper layer of zeolite 221. The zeolite removes all but minute traces of the other gases to form product hydrogen gas containing less than one volume per million of carbon monoxide and no measurable trace of any other impurity. The hydrogen product is withdrawn from the upper vessel 212 throughout the period in which the feed gas is introduced therein. This feed/production step continues until there is about to occur a "break-out" of impurities from the adsorbent which would contaminate the hydrogen product. In a typical cycle, the feed/production step lasts for from about two to six minutes.

In the next step of the process, feed/production is halted and the top of the vessel 212 is placed in communication with the top of the vessel 216 which has previously been purged with product hydrogen. This reduces the pressure in vessels 202 and 212 while vessels 206 and 216 are pressurized with hydrogen gas of near product purity. As the gas flows out of the vessel 212, the pressure in vessels 202 and 212 falls and carbon monoxide tends to be desorbed from the adsorbent in preference to methane, carbon dioxide and water vapor. This step of the cycle typically lasts between about twenty and forty seconds and is ended by stopping communication between the tops of vessels 212 and 216.

Since, in the previous step carbon monoxide has been desorbed from the adsorbent, gas mixture in the void spaces of the beds 210 and 217 in the vessels 202 and 212 is now enriched in carbon monoxide. Therefore, in the next step, this gas mixture is withdrawn via the connecting conduit 205 through the product pipeline 236. Withdrawal of the product causes the pressure in the vessels 202 and 212 to fall with further desorption of carbon monoxide. The arrangement of the unit shown in FIG. 2 which enables carbon monoxide-enriched gas mixture to be withdrawn from the conduit 205 is particularly advantageous. If the carbon monoxide-enriched gas mixture were to be withdrawn from the top of the vessel 212, small amounts of carbon monoxide retained in the layer 221 in the bed 217 would contaminate the product in a subsequent hydrogen production step. Further, during withdrawal of the carbon monoxide-enriched gas mixture, carbon dioxide may reach and be adsorbed in the zeolite layer 221. Since complete desorption of the carbon dioxide from the molecular sieve requires a high flow rate of purge gas, carbon dioxide build-up may occur. This can adversely affect product purity and the efficient operation of the process cycle. Typically, the production of the carbon monoxide-enriched gas mixture continues for about two minutes and is stopped prior to a significant break out of carbon dioxide from the adsorbent in the vessels 202 and 212. The resulting carbon monoxide-enriched mixture, which is produced at a pressure of between about 10 and 40 psig, generally contains at least about 20% by volume of carbon monoxide, the balance being mainly hydrogen with up to about 2% of methane and carbon dioxide.

The production of carbon monoxide-enriched gas mixture is stopped by ending communication between the pipeline 236 and the connecting conduit 205. The next step of the cycle is to withdraw carbon dioxide-enriched gas mixture through port 203 at the bottom of the bed 210 in the vessel 202 and send it for further processing through the pipeline 238. The flow of the carbon dioxide enriched gas mixture is countercurrent to the flow of the feed gas mixture in the hydrogen production step. The carbon dioxide-enriched gas mixture is typically produced at a pressure of about 5 psig. The reduction in pressure during this step and the hydrogen product purge during the subsequent step is effective to cause desorption of carbon dioxide from the adsorbents. Generally, the withdrawal of the carbon dioxide-enriched gas mixture is continued for the period of for about 1–2 minutes (typically about 80 seconds). After depressurization, additional withdrawal of the carbon dioxide-enriched gas mixture is performed by opening the port 207 of the vessel 212 to the hydrogen purge pipeline 224. The bed 217 is thus purged typically for about four minutes by a flow of hydrogen countercurrent to the direction in which the hydrogen is produced. The hydrogen purge gas tends to sweep out impurities from the void spaces in the bed 217 through the bed 210 in the vessel 202 and into the pipeline 238. This gas mixture generally contains at least 50% by volume of carbon dioxide and less than 10% by volume of carbon monoxide, the balance being mostly hydrogen with a small amount of methane and a trace amount of water vapor.

The next steps of the cycle are performed so as to prepare the beds 210 and 217 for further hydrogen production in the next cycle by building up the pressure and concentration of hydrogen in the void spaces of the beds 210 and 217. A first build up of pressure is then effected by ending communication between the purge gas pipeline 224 and the vessel 212 and placing the top of the vessel 216, which has just completed hydrogen production, in communication with the top of vessel 212 through the pressure equalization conduit 232, while stopping communication between the port 203 of the vessel 202 and the pipeline 238. This produces a flow of hydrogen from vessel 216 to vessel 212. This step may be continued for from about 30 to 60 seconds (typically about 40 seconds). Communication between the vessels 212 and 216 is then ended and vessels 212 and 202 are brought up to pressure by placing the top of the vessel 212 in communication with the product repressurization pipeline 230. During this step, there is a back flow of hydrogen product into vessels 212 and 202. The product repressurization may be carried out for a period of from 3–4 minutes (typically 200 seconds) and then stopped by ending communication between the pipeline 230 and port 207 of vessel 212. The vessels 202 and 212 are then ready to repeat the cycle.

Each pair of adsorber vessels 202 and 212, 204 and 214, 206 and 216, and 208 and 218 performs the above-described cycle in predetermined phase relationship with the cycles performed by other pairs of vessels. The respective phasing of the cycles and the positions of the switching valves required to effect switching from step to step is shown in Tables 1 and 2 below:

TABLE 1

| | CYCLE PHASING | | | |
|---|---|---|---|---|
| Step | Vessels 202 and 212 | Vessels 204 and 214 | Vessels 206 and 216 | Vessels 208 and 218 |
| 1 | Feed/H$_2$ production | Bed pressure equalization | Product purge/ CO$_2$ enriched gas mixture production | Bed pressure equalization |
| 2 | Feed/H$_2$ production | Product repressurization | Product purge/ CO$_2$ enriched gas mixture production | CO enriched gas mixture production |
| 3 | Feed/H$_2$ production | Product repressurization | Product purge/ CO$_2$ enriched gas mixture production | CO$_2$ enriched gas mixture production by depressurization. |
| 4 | Bed pressure | Feed/H$_2$ production | Bed pressure | Product purge/ |

TABLE 1-continued

CYCLE PHASING

| Step | Vessels 202 and 212 | Vessels 204 and 214 | Vessels 206 and 216 | Vessels 208 and 218 |
|---|---|---|---|---|
|  | equalization |  | equalization | $CO_2$ enriched gas mixture production. |
| 5 | CO enriched gas mixture production | Feed/$H_2$ production | Product repressurization | Product purge/ $CO_2$ enriched gas mixture production. |
| 6 | $CO_2$ enriched gas mixture production by depressurization | Feed/$H_2$ production | Product repressurization | Product purge/ $CO_2$ enriched gas mixture production. |
| 7 | Product purge/$CO_2$ enriched gas mixture production | Bed pressure equalization | Feed/$H_2$ production | Bed pressure equalization |
| 8 | Product purge/$CO_2$ enriched gas mixture production | CO enriched gas mixture production | Feed/$H_2$ production | Product repressurization |
| 9 | Product purge/$CO_2$ enriched gas mixture production | $Co_2$ enriched gas mixture production by depressurization | Feed/$H_2$ production | Product repressurization |
| 10 | Bed pressure equalization | Product purge/ $CO_2$ enriched gas mixture production. | Bed pressure equalization | Feed/$H_2$ production |
| 11 | Product repressurization | Product purge/ $CO_2$ enriched gas mixture production. | CO enriched gas mixture production | Feed/$H_2$ production |
| 12 | Product repressurization | Product purge/ $CO_2$ enriched gas mixture production. | $CO_2$ enriched gas mixture production by depressurization | Feed/$H_2$ production |

TABLE 2

SWITCHING VALVE OPERATION CHART

| Step | Time/secs | Switching Valves open* |
|---|---|---|
| 1 | 40 | 240, 248, 274, 260, 288 |
| 2 | 120 | 240, 248, 266, 260, 282, 288 |
| 3 | 80 | 240, 248, 260, 266, 288, 290 |
| 4 | 40 | 272, 242, 250, 262, 290 |
| 5 | 120 | 276, 242, 250, 268, 262, 290 |
| 6 | 80 | 284, 242, 250, 268, 262, 290 |
| 7 | 40 | 256, 274, 244, 252, 284 |
| 8 | 120 | 256, 278, 244, 252, 270, 284 |
| 9 | 80 | 256, 286, 244, 252, 270, 284 |
| 10 | 40 | 272, 258, 246, 254, 286 |
| 11 | 120 | 264, 258, 280, 246, 254, 286 |
| 12 | 80 | 264, 258, 288, 246, 254, 286 |

Figure 3:
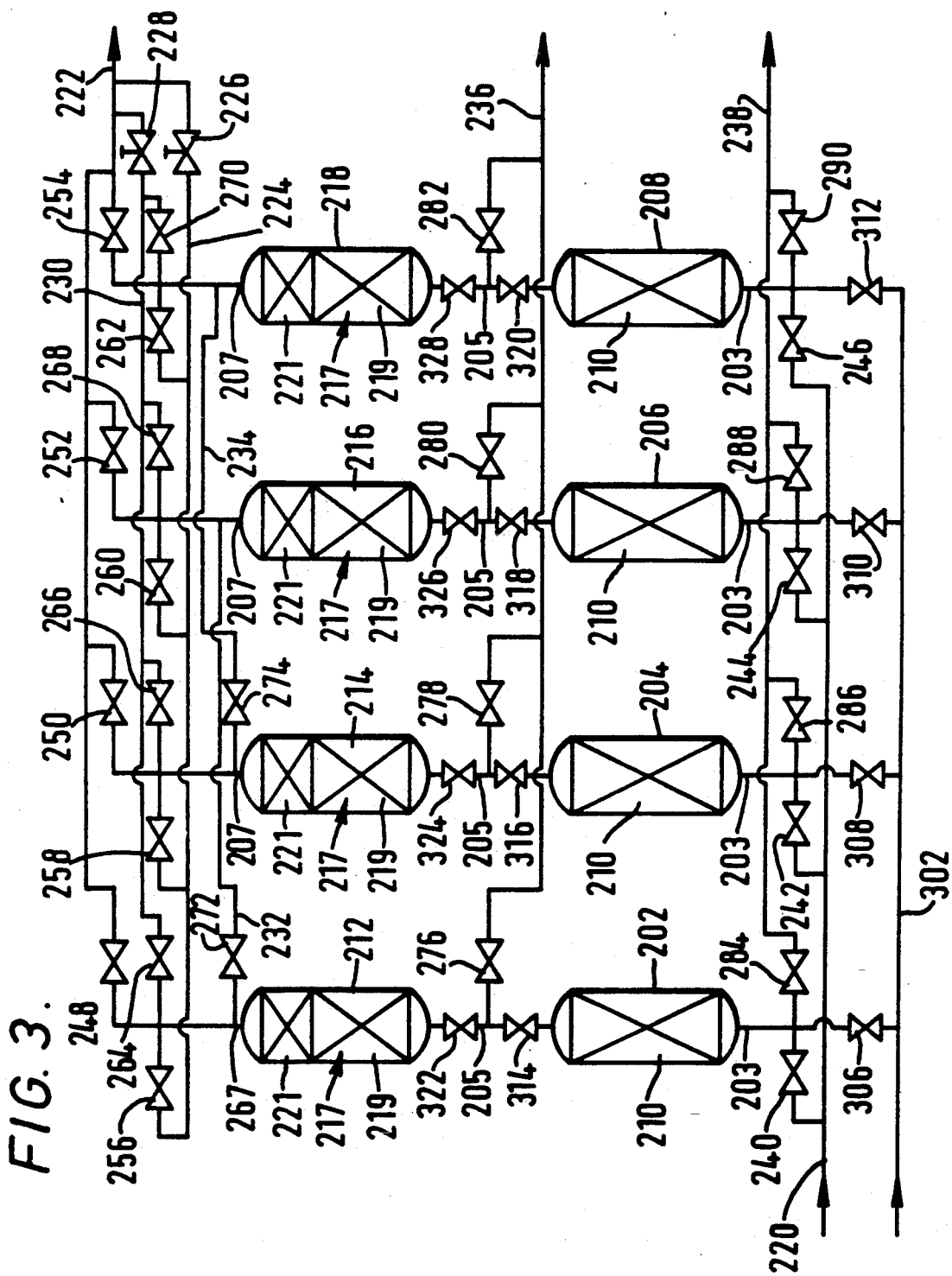
FIG. 3 is an alternative PSA apparatus for producing hydrogen being suitable for use in the apparatus shown in FIG. 1.

In FIG. 3 there is illustrated a modification to the PSA unit shown in FIG. 2 with like parts having the same designations. The PSA unit shown in FIG. 3 is intended to perform similar cycles to the ones performed by that of FIG. 2 with the exception of the carbon monoxide-enriched gas mixture production step which is divided into parts (a) and (b). With reference to the vessels 202 and 212, in part (a), the carbon monoxide-enriched gas mixture is only withdrawn from the upper vessel 212, whereas in part (b) it is only withdrawn from the lower vessel 202. Moreover, in part (a) the bed 210 in the vessel 202 is swept from its bottom with a portion of the carbon dioxide-enriched gas mixture produced in operation of the plant and compressed in the vent gas compressor 172 shown in FIG. 1 to a suitable pressure (e.g. 260 psia). The effect of the sweep gas is to increase the recovery of carbon monoxide in the carbon monoxide enriched gas mixture. The sweep gas displaces carbon monoxide from the bottom of the bed 210 in the vessel 202 towards the top which enhances carbon monoxide production. In order to carry out this modification, additional valves and pipelines are provided in the PSA unit shown in FIG. 3. Thus, the conduit 205 connecting the vessels 202 and 212 has switching valves 314 and 322 disposed therein so that the pipeline 236 terminates in the conduit 205 at a location intermediate the valves 314 and 322. A pipeline 302, connected to the discharge of compressor 172 shown in FIG. 1, is provided for supplying the sweep gas. A stop valve 306, when open, permits the flow of gas from the pipeline 302 into the bottom of the vessel 202 through port 203.

The pairs of vessels 204 and 214, 206 and 216, and 208 and 218 have, respectively, switching valves 316 and 324, 318 and 326, 320 and 328 disposed in their connecting conduits 205 corresponding to the switching valves 314 and 322. In addition, the vessels 204, 206 and 208 have associated therewith switching valves 308, 310 and 312, respectively, corresponding to the stop valve 306 associated with the port 203 of the vessel 202.

Typically, parts (a) and (b) of the carbon monoxide-enriched gas mixture production step have durations on the order of 40 seconds and 80 seconds, respectively. The respective phasing of the cycles performed using each pair of adsorbent vessels and the positions of the switching valves required to effect switching from step to step are shown in Tables 3 and 4 below.

Figure 4:
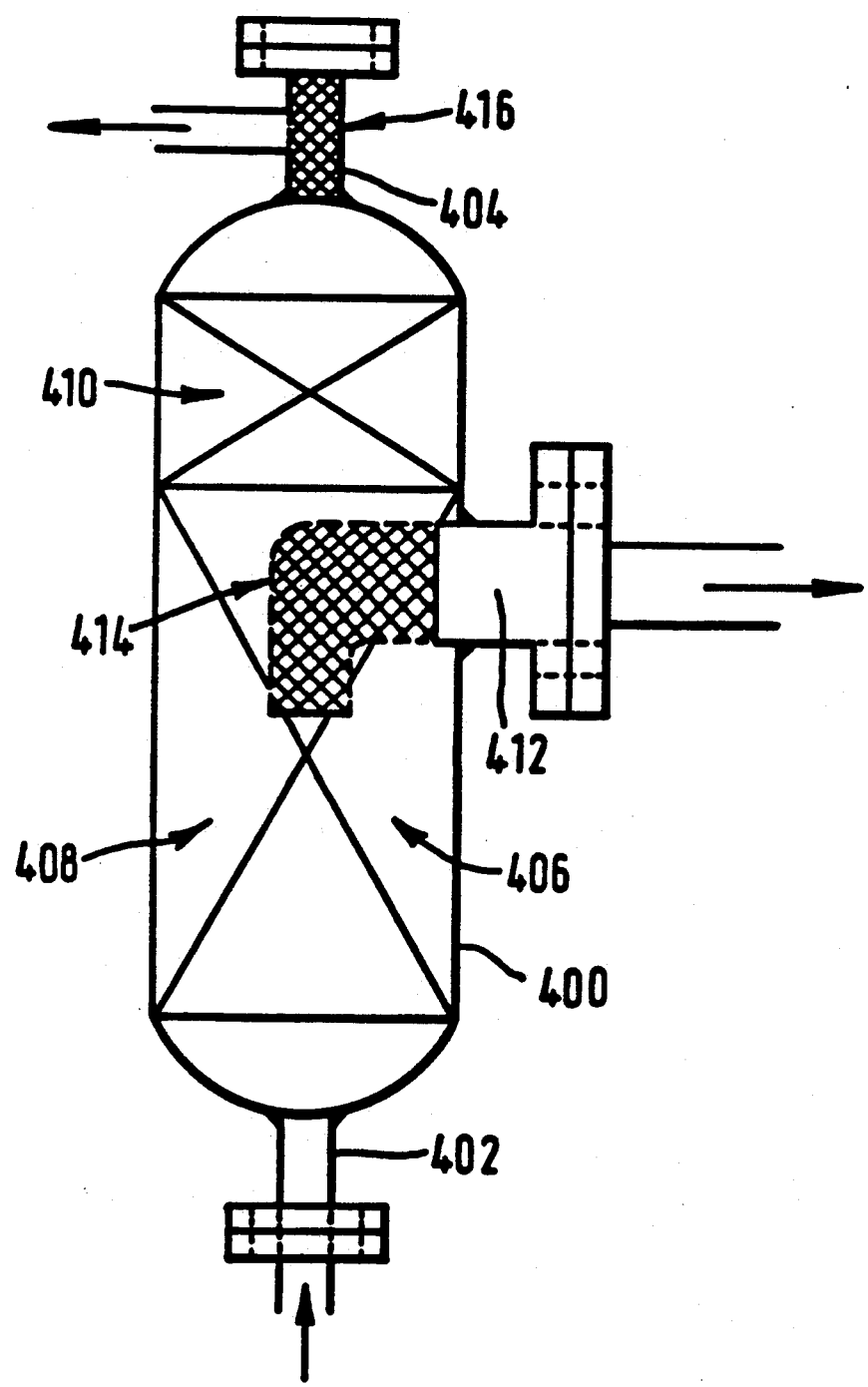
FIG. 4 is a schematic diagram of an adsorber for use in the apparatus shown in FIG. 2.

Referring again to the apparatus shown in FIG. 2, it is possible to substitute for each pair of adsorbent vessels 202 and 212, 204 and 214, 206 and 216, and 208 and 218, a single adsorber vessel of the kind shown in FIG. 4. Referring to FIG. 4, vessel 400 is generally columnar and has a port 402 at its bottom and a port 404 at its top. The vessel contains a bed 406 of adsorbent comprising a lower layer 408 of activated carbon and an upper layer 410 of zeolite molecular sieve. There is a port 412 in the side of the vessel which communicates with the interior of the layer 408 by means of a generally L-shaped tubular member 414 formed of fine mesh. There is a similar fine mesh member 416 disposed in the port 404. In operation, the feed gas mixture is passed into and carbon dioxide-enriched gas mixture withdrawn from the vessel 400 through the port 402, hydrogen product withdrawn through the port 404 and carbon monoxide-enriched gas mixture withdrawn through the port 412. It can be appreciated that the side port 412 communicating with the activated carbon layer 408 makes it possible to withdraw the carbon monoxide-enriched gas mixture from a location intermediate the withdrawal points of the hydrogen product and the carbon dioxide-enriched gas mixture without the need to employ two separate adsorbent vessels. However, it is not possible to use such adsorbent vessels 400 in the apparatus shown in FIG. 3 since it is not possible to isolate that part of the bed 406 below the tubular member 414 from the part thereabove.

TABLE 4

SWITCHING VALVE OPERATION CHART

| Step | Time/Secs | Switching Valves open* |
|---|---|---|
| 1 | 40 | 240,248,274,260,288,314,316,318,320,322,324,326,328 |
| 2(a) | 40 | 240,248,266,260,282,288,312,314,316,318,322,324,326,328 |
| 2(b) | 80 | 240,248,266,260,282,288,314,316,318,320,322,324,326 |
| 3 | 80 | 240,248,266,260,288,290,314,316,318,320,322,324,326,328 |
| 4 | 40 | 272,242,250,262,290,314,316,318,320,322,324,326,328 |
| 5(a) | 40 | 276,242,250,268,262,290,306,316,318,320,322,324,326,328 |
| 5(b) | 80 | 276,242,250,268,262,290,314,316,318,320,322,324,326,328 |
| 6 | 80 | 284,242,250,268,262,290,314,316,318,320,322,324,326,328 |
| 7 | 40 | 256,284,274,244,252,314,316,318,320,322,324,326,328 |
| 8(a) | 40 | 256,284,278,244,252,270,308,314,318,320,322,324,326,328 |

TABLE 3

CYCLE PHASING

| Step | Vessels 202 and 212 | Vessels 204 and 214 | Vessels 206 and 216 | Vessels 208 and 218 |
|---|---|---|---|---|
| 1 | Feed/H₂ production | Bed pressure equalization | Product purge/CO₂ enriched gas mixture production | Bed pressure equalization |
| 2(a) | Feed/H₂ production | Product repressurization | Product purge/CO₂ enriched gas mixture production | CO enriched gas production from vessel 218/sweep vessel 208 with CO₂ enriched gas mixture |
| 2(b) | Feed/H₂ production | Product repressurization | Product purge/CO₂ enriched gas mixture production | CO enriched gas mixture production from vessel 208 |
| 3 | Feed/H₂ production | Product repressurization | Product purge/CO₂ enriched gas mixture production | CO₂ enriched gas production |
| 4 | Bed pressure equalization | Feed/H₂ production | Bed pressure equalization | Product purge/CO₂ enriched gas mixture production |
| 5(a) | CO enriched gas mixture production from vessel 212/sweep vessel 202 with CO₂ enriched gas mixture | Feed/H₂ production | Product repressurization | Product purge/CO₂ enriched gas mixture production |
| 5(b) | CO enriched gas mixture production from vessel 202 | Feed/H₂ production | Product repressurization | Product purge/CO₂ enriched gas mixture production |
| 6 | CO₂ enriched gas mixture production | Feed/H₂ production | Product repressurization | Product purge/CO₂ enriched gas mixture production |
| 7 | Product purge/CO₂ enriched gas mixture production | Bed pressure equalization | Feed/H₂ production | Bed pressure equalization |
| 8(a) | Product purge/CO₂ enriched gas mixture production | CO enriched gas mixture production from vessel 214/sweep vessel 204 with CO₂ enriched gas mixture | Feed/H₂ production | Product repressurization |
| 8(b) | Product purge/CO₂ enriched gas mixture production | CO enriched gas product from vessel 204 | Feed/H₂ production | Product repressurization |
| 9 | Product purge/CO₂ enriched gas mixture production | CO₂ enriched gas mixture production | Feed/H₂ production | Product repressurization |
| 10 | Bed pressure equalization | Product purge/CO₂ enriched gas mixture production | Bed pressure equalization | Feed/H₂ production |
| 11(a) | Product repressurization | Product purge/CO₂ enriched gas mixture production | CO enriched gas mixture production from vessel 216/sweep vessel 206 from CO₂ enriched gas mixture | Feed/H₂ production |
| 11(b) | Product repressurization | Product purge/CO₂ enriched gas mixture production | CO enriched gas mixture production from vessel 206 | Feed/H₂ production |
| 12 | Product repressurization | Product purge/CO₂ enriched gas mixture production | CO₂ enriched gas mixture production | Feed/H₂ production |

TABLE 4-continued

SWITCHING VALVE OPERATION CHART

| Step | Time/ Secs | Switching Valves open* |
|---|---|---|
| 8(b) | 80 | 256,284,278,244,252,270,314,316,318,320,322,326,328 |
| 9 | 80 | 256,284,286,244,252,270,314,316,318,320,322,324,326,328 |
| 10 | 40 | 272,258,286,246,254,314,316,318,320,322,324,326,328 |
| 11(a) | 40 | 264,258,286,280,246,254,310,314,316,320,322,324,326,328 |
| 11(b) | 80 | 264,258,286,280,246,254,314,316,318,320,322,324,328 |
| 12 | 80 | 264,258,286,288,246,254,314,316,318,320,322,324,326,328 |

In a preferred embodiment of the subject invention, three beds of adsorbent are utilized in the first stage of the two stage separation of carbon monoxide product from the gas mixture enriched in carbon monoxide. Between production of the gas mixture feed to the second stage and purging of the adsorbent, the adsorbent vessel is subjected to a three stage depressurization process in which it is first reduced in pressure by placing it in communication with an equalization vessel, then further reduced in pressure by passing gas from it to a tank in which waste gas for recycle to the reformer is collected and finally reduced in pressure by placing it in communication with a tank in which the gas mixture enriched in carbon monoxide is collected. The equalization tank is used after a purge step to repressurize the adsorbent.

The times for the above-mentioned second and third stage depressurization steps are selected to allow a desired flow split of the multicomponent gas mixture released from the adsorbent bed. The concentration of the multicomponent gas mixture continuously changes with time. Initially, it has a very high ratio of an impurity (carbon dioxide) to desired product (carbon monoxide and hydrogen) which decreases over time. The time-based split of the depressurization into two steps allows the collection of a first high impurity gas stream which is removed as a waste gas and a second low impurity gas which is recycled to the feed gas storage vessel for further processing. This method represents a substantial improvement in the art of separating multicomponent gas mixtures by PSA and can be readily applied to the separation of gas mixtures other than hydrogen, carbon monoxide, carbon dioxide and methane. The operation of such a three-stage depressurization process is illustrated with reference to FIG. 5.

Figure 5:
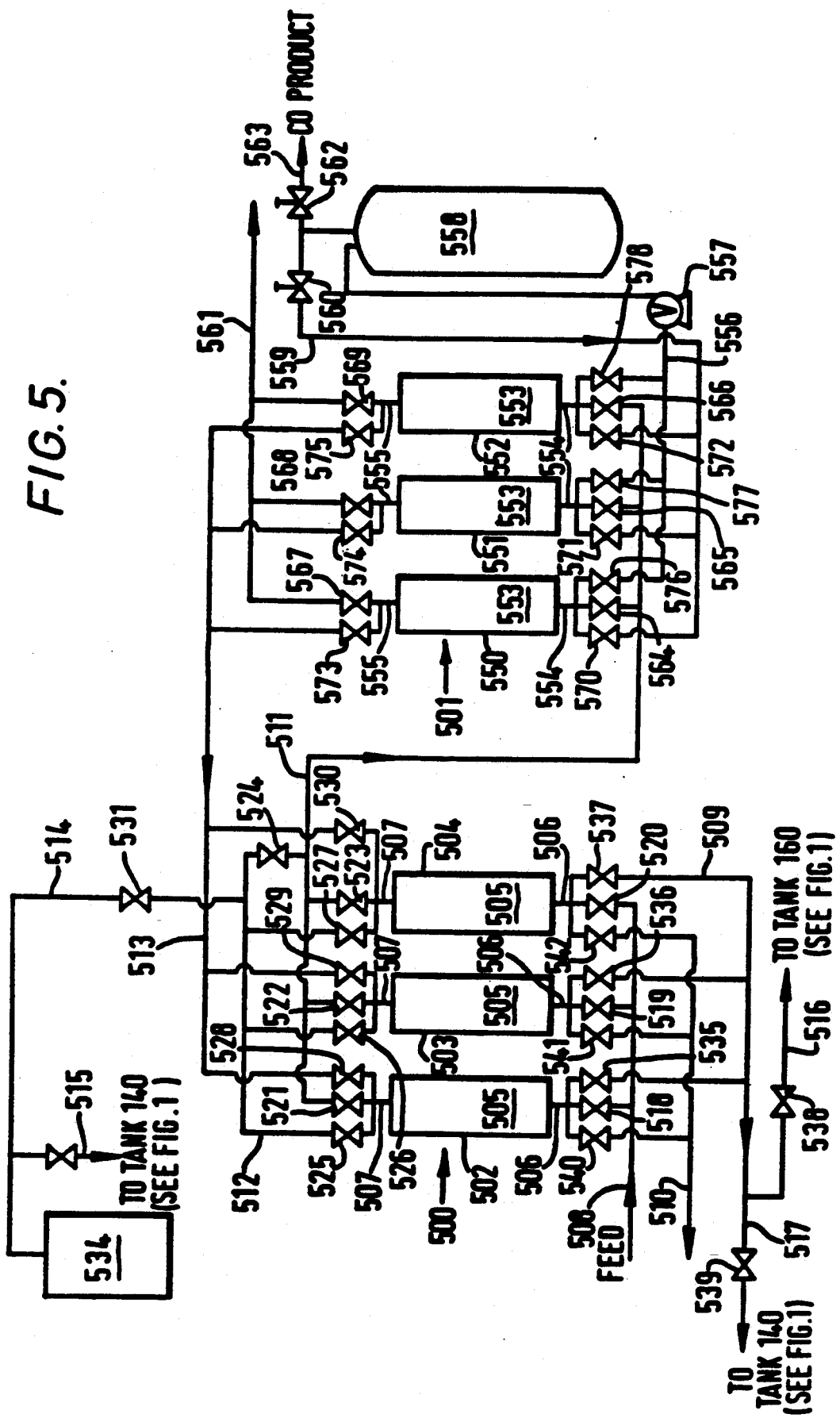
FIG. 5 is a schematic diagram illustrating a PSA unit for producing carbon monoxide suitable for use in the apparatus shown in FIG. 1.

Referring now to FIG. 5, there is shown a two-stage PSA unit suitable for use as the PSA unit 148 in FIG. 1. The first stage 500 includes three generally identical adsorber vessels 502, 503 and 504, arranged in parallel, each containing a bed 505 of suitable adsorbent, typically activated carbon, effective to adsorb carbon dioxide and methane impurities from the carbon monoxide-enriched gas mixture. Each adsorber vessel has a gas flow port 506 at the bottom and a gas flow port 507 at the top. The gas flow ports 506 communicate with a feed gas pipeline 508 which extends from the storage tank 140, shown in FIG. 1, a gas recovery pipeline 509 and a vent pipeline 510. The gas recovery pipeline 509 communicates with a waste gas pipeline 516 which terminates in waste gas tank 160 (not shown in FIG. 5) and a recycle pipeline 517 which terminates in an inlet to the carbon monoxide-enriched gas mixture tank 140 (not shown in FIG. 5). The vessels 502, 503 and 504 communicate through their ports 507 with a pipeline 511 for conducting a mixture consisting essentially of carbon monoxide and hydrogen to the second stage 501 of the PSA unit, a first purge gas pipeline 512 for alternately purging and repressurizing each bed 505 with the mixture of carbon monoxide and hydrogen produced by the first stage 500, and a second purge gas pipeline 513 for purging the beds 505 with gas from the second stage 501. The first stage 500 also has a pressure equalization pipeline 514 extending from an intermediate location in the first purge gas pipeline 512 to a tank 534. The tank 534 also communicates with a pipeline 515 which returns gas to the feed gas tank 140 (not shown in FIG. 5).

The first stage of the apparatus shown in FIG. 5 is also provided with switching valves operable to select during each cycle of operation which vessel communicates with each of the respective pipelines. Accordingly, switching valves 518, 519 and 520 determine which of vessels 502, 503, 504 communicates with the feed gas pipeline 508. Switching valves 521, 522 and 523 operate to supply a purified gas mixture essentially free of carbon dioxide and methane from the vessels 502, 503 and 504 through their respective ports 507 to the pipeline 511 which serves as the inlet to the second stage of the apparatus 501. The first purge gas pipeline 512 has a stop valve 524 disposed in it which, when open, enables a part of the gas from the pipeline 511 to be used alternately as purge gas and repressurization gas for the vessels 502, 503 and 504. The vessels 502, 503 and 504 have, respectively, switching valves 525, 526 and 527 which operate to place the vessels in communication with a purified gas mixture of carbon monoxide and hydrogen through their respective ports 507. Similarly, switching valves 528, 529 and 530, associated respectively with vessels 502, 503 and 504, when open, allow gas purged from the second stage 501 of the unit to flow from the pipeline 513 into the respective vessel through its port 507. The pressure equalization pipeline 514 also has a stop valve 531 disposed therein, and the outlet from the equalization tank 534 has a stop valve 532 disposed therein. There are two main paths for the discharge of gas from the bottom of the vessels 502, 503 and 504. The first path is via the recovery gas pipeline 509, as determined by respective switching valves 535, 536 and 537. In addition, switching valves 538 and 539 in the pipelines 516 and 517, respectively, determine whether the gas flowing through the pipeline 509 is returned to tank 140 or tank 160 (shown in FIG. 1). The second path for the discharge of gas from the bottom of the vessels 502, 503, 504 is via the pipeline 510 as controlled by switching valves 540, 541 and 542. Gas flowing into the pipeline 510 may be returned to tank 160 or discharged from the plant through its stack (not shown).

All the switching valves described above with reference to the first stage 500 of the PSA unit shown in FIG. 5 may be operated automatically in conformity with a predetermined cycle which will now be described with respect to the adsorbent bed in the vessel 502.

Compressed carbon monoxide enriched gas mixture, typically comprising, by volume, from about 55 to 80% of hydrogen, from about 15 to 40% of carbon monoxide with lesser quantities of carbon dioxide, methane and water vapor is fed into the vessel 502 through its port 506. The activated carbon adsorbent contained therein adsorbs water vapor, carbon dioxide and methane in preference to carbon monoxide and hydrogen. The effluent mixture of hydrogen and carbon monoxide passes out of the vessel 502 through its port 507 into the pipeline 511 and is fed to the second stage 501 of the unit for separation of carbon monoxide from hydrogen. Admission of feed gas to the vessel 502 is carried out for a predetermined period, typically about 3-4 minutes, and stopped before the adsorbent bed 505 becomes saturated with impurities to the extent that break out would occur. The next steps of the cycle involves recovering unadsorbed gas from the vessel 502. First, upon completion of the feed step, the top of the vessel 502 is placed in communication with the equalization tank 534 so that a gas mixture comprising carbon monoxide and hydrogen and only traces of impurity is passed to the equalization tank 534 from the top of the vessel 502. Typically, this step lasts only a few seconds, e.g. from 10 to 20 seconds. Next, unadsorbed gas from the bottom of the vessel 502 is passed via the pipelines 509 and 516 to the waste gas tank 160 (see FIG. 1). The gas mixture so discharged from the vessel 502 is generally richer in carbon dioxide and methane than the feed gas mixture as these gases, particularly carbon dioxide, tend to concentrate at the bottom of the bed 505. However, once the gas from the very bottom of the bed has been vented, usually in less than 10 seconds, a gas mixture from the vessel can be recycled to the feed tank 140 (see FIG. 1). Accordingly, communication between the bottom of the vessel 502 and the pipeline 516 is stopped after a period of less than 10 seconds and the port 506 of the vessel 502 is then placed in communication with the pipeline 517 to enable the gas mixture to be recycled to the tank 140. During the recycle step, the pressure of the bed 505 in vessel 502 gradually falls until it reaches a minimum typically from about 5 to 10 psig.

The next steps of the process involve employing purge gas to flush out impurities from the bed. In a first purge gas step, a part of the purified gas mixture of carbon monoxide and hydrogen is taken from the vessel 503 and introduced into the top of the vessel 502 counter currently to the direction of the feed gas flow. The gas flows from the bottom of the vessel 502 into the vent gas pipeline 510 from which it may preferably be passed to the tank 160 (see FIG. 1) for use as fuel, or vented from the plant. This first purge step generally lasts about one minute. Communication is then ended between port 507 of vessel 502 and pipeline 512 and between port 506 of vessel 502 and pipeline 510. During the first purge step, the amount of impurities present in vessel 502 is considerably reduced and in subsequent purge steps it becomes possible to recover the gas passing out of the port 506 of vessel 502. In the next purge step, purge gas comprising a mixture of hydrogen and carbon monoxide from the second stage 501 of the unit shown in FIG. 5 is passed from pipeline 512 into the top of the vessel 502 through its port 507 and flows downwardly therethrough exiting through port 506 and passing to the tank 160 (see FIG. 1). During this purge step, further impurities are swept from vessel 502 and thus, the impurity level of the exiting gas mixture tends to fall. This purge step typically lasts about 10 to 20 seconds and ends by stopping communication between the pipelines 509 and 516. Thereupon, pipeline 509 is placed in communication with pipeline 517 leading to the carbon monoxide-enriched gas mixture tank 140 (see FIG. 1) so that the gas leaving the bottom of the vessel 502 now flows thereto. Preferably, this flow of gas continues for from 1 to 2 minutes. At the end of this step, communication between the bottom of the vessel 502 and the pipelines 509 and 517 is discontinued.

The next steps concern charging the vessel 502 with the hydrogen and carbon monoxide mixture ready for the next cycle. Accordingly, port 506 in the bottom of vessel 502 is closed to all the connected pipelines and purge gas from pipeline 513 is allowed to flow into the vessel through port 507, generally for one to two minutes. The vessel 502 is thereby pressurized to the available pressure of the second stage purge gas. Vessel 502 is then repressurized with gas from the equalization tank 534. This generally requires only a few seconds, e.g. from 10 to 20 seconds. The final step in pressurization involves placing the first purge gas pipeline 512 in communication with the vessel 502 through its port 507 and introducing into vessel 502 part of the impurity-free gas mixture comprising carbon monoxide and hydrogen being produced simultaneously in the vessel 504. Vessel 502 is now fully pressurized and ready to produce impurity-free mixture of carbon monoxide and hydrogen at the required pressure at the start of the next cycle. Simultaneously with performing this step, equalization tank 534 is placed in communication with the tank 140, containing carbon monoxide-enriched gas mixture so as to recover further gas from the equalization tank 534. This step requires from 60 to 90 seconds after which the vessel 502 is then ready to be used in the next cycle.

It is to be appreciated that while the above described cycle of operations is being performed using the vessel 502, identical cycles are being performed using the vessels 503 and 504 in appropriate phase relation to one another. The relationship between these cycles is illustrated in Table 5 which sets out all the steps of each cycle in the order in which they are performed and the duration of each step. In Table 6, below, there is set out a list of which valves are open during the respective steps of the cycle.

TABLE 5

| Step No. | Duration (secs) | Vessel 502 | Vessel 503 | Vessel 504 |
|---|---|---|---|---|
| 1 | 12 | Feed/Production of purified CO—$H_2$ mixture | Repressurize via second purge pipeline 513 to atmosphere | Depressurize to equalization tank 534 |
| 2 | 6 | Feed/Production of purified CO—$H_2$ mixture | Repressurize via second purge pipeline 513 | Depressurize to waste tank 160 |
| 3 | 34 | Feed/Production of purified CO—$H_2$ mixture | Repressurize via second purge pipeline 513 | Depressurize to feed tank 140 |
| 4 | 60 | Feed/Production of purified CO—$H_2$ mixture | Repressurize via second purge pipeline 513 | Purge from first purge pipeline 512 to atmosphere |
| 5 | 14 | Feed/Production of purified CO—$H_2$ mixture | Repressurize from equalization tank 534 | Purge from second purge pipeline 513 to waste tank 160 |
| 6 | 12 | Feed/Production of purified CO—$H_2$ mixture | Repressurize from equalization tank 534. | Purge from second purge pipeline 513 to feed tank 140 |
| 7 | 72 | Feed/Production of purified CO—$H_2$ mixture | Repressurize with first stage product via pipeline 512 and pass gas from equalization | Purge from second purge pipeline 513 to feed tank 140 |

TABLE 5-continued

| Step No. | Duration (secs) | Vessel 502 | Vessel 503 | Vessel 504 |
|---|---|---|---|---|
| 8 | 12 | Depressurize to equalization tank 534 | tank 534 to feed tank 140 Feed/Production of purified CO—$H_2$ mixture | Repressurize via second purge pipeline 513 |
| 9 | 6 | Depressurize to waste tank 160 | Feed/Production of purified CO—$H_2$ mixture | Repressurize via second purge pipeline 513 |
| 10 | 34 | Depressurize to feed tank 140 | Feed/production of purified CO—$H_2$ mixture | Repressurize via second purge pipeline 513 |
| 11 | 60 | Purge from first purge pipeline 512 to atmosphere | Feed/Production of purified CO—$H_2$ mixture | Repressurize via second purge pipeline 513 |
| 12 | 14 | Purge from second purge pipeline 513 to waste tank 160 | Feed/Production of purified CO—$H_2$ mixture | Repressurize from equalization tank 534 |
| 13 | 12 | Purge from second purge pipeline 513 to feed tank 140 | Feed/Production of purified CO—$H_2$ mixture | Repressurize from equalization tank 534 |
| 14 | 72 | Purge from second purge pipeline 513 to feed tank 140 | Feed/Production of purified CO—$H_2$ mixture; | Repressurize with first stage product via pipeline 512 and pass gas from equalization tank 534 to feed tank 140 |
| 15 | 12 | Repressurize via second purge pipeline 513 | Depressurize to equalization tank 534 | Feed/Production of purified CO—$H_2$ mixture |
| 16 | 6 | Repressurize via second purge pipeline 513 | Depressurize to waste tank 160 | Feed/Production of purified CO—$H_2$ mixture |
| 17 | 34 | Repressurize via second purge pipeline 513 | Depressurize to feed tank 140 | Feed/Production of purified CO—$H_2$ mixture |
| 18 | 60 | Repressurize via second purge pipeline 513 | Purge from first purge pipeline 512 to atmosphere | Feed/Production of purified CO—$H_2$ mixture |
| 19 | 14 | Repressurize from equalization tank 534 | Purge from second purge pipeline 513 to waste tank 160 | Feed/Production of purified CO—$H_2$ mixture |
| 20 | 12 | Repressurize from equalization tank 534 | Purge from second purge pipeline 513 to feed tank 140 | Feed/Production of purified CO—$H_2$ mixture |
| 21 | 72 | Repressurize with first stage product via pipeline 512 and pass gas from equalization tank 534 to feed tank 140 | Purge from second purge pipeline 513 to feed tank 140 | Feed/Production of purified CO—$H_2$ mixture |

TABLE 6

| STEP 1 | VALVES OPEN: | 518,521,527,529,531, |
| | VALVES SHUT: | 519,520,522,523,524,525,526,528,530, 532,535,536,537,538,539,540,541,542 |
| STEP 2 | VALVES OPEN: | 518,521,529,537,538 |
| | VALVES SHUT: | 519,520,522,523,524,525,526,527,528, 530,531,532,535,,536,539,540,541,542 |
| STEP 3 | VALVES OPEN: | 518,521,529,537,539 |
| | VALVES SHUT: | 519,520,522,523,524,525,526,527,528, 530,531,532,535,536,538,540,541,542 |
| STEP 4 | VALVES OPEN: | 518,521,524,527,529,542 |
| | VALVES SHUT: | 519,520,522,523,525,526,528,530,531, 532,535,536,537,538,539,540,541 |
| STEP 5 | VALVES OPEN: | 518,521,526,530,531,537,538 |
| | VALVES SHUT: | 519,520,522,523,524,525,527,528,529, 532,535,536,539,540,541,542 |
| STEP 6 | VALVES OPEN: | 518,521,526,530,531,537,539 |
| | VALVES SHUT: | 519,520,522,523,524,525,527,528,529, 532,535,536,538,540,541,542 |
| STEP 7 | VALVES OPEN: | 518,521,524,526,530,532,537,539 |
| | VALVES SHUT: | 519,520,522,523,525,527,528,529,531, 535,536,538,540,541,542 |
| STEP 8 | VALVES OPEN: | 519,522,525,530,531 |
| | VALVES SHUT: | 518,520,521,523,524,526,527,528,529, 532,535,536,537,538,539,540,541,542 |
| STEP 9 | VALVES OPEN: | 519,522,530,535,538 |
| | VALVES SHUT: | 518,520,521,523,524,525,526,527,528, 529,531,532,536,537,539,540,541,542 |
| STEP 10 | VALVES OPEN: | 519,522,530,535,539 |
| | VALVES SHUT: | 518,520,521,523,524,525,526,527,528, 529,531,532,536,537,538,540,541,542 |
| STEP 11 | VALVES OPEN: | 519,522,524,525,530,540 |
| | VALVES SHUT: | 518,520,521,523,526,527,528,529,531, 532,535,536,537,538,539,541,542 |
| STEP 12 | VALVES OPEN: | 519,522,527,528,531,535,538 |
| | VALVES SHUT: | 518,520,521,523,524,525,526,529,530, 532,536,537,539,540,541,542 |
| STEP 13 | VALVES OPEN: | 519,522,527,528,535,539, 531 |
| | VALVES SHUT: | 518,520,521,523,524,525,526,529,530, 532,536,537,538,540,541,542 |
| STEP 14 | VALVES OPEN: | 519,522,524,527,528,532,535,539 |
| | VALVES SHUT: | 519,520,521,523,525,526,529,530,531, 536,537,538,540,541,542 |
| STEP 15 | VALVES OPEN: | 520,523,526,538,531, |
| | VALVES SHUT: | 518,519,521,522,524,525,527,529,530, 532,535,536,537,538,539,540,541,542 |
| STEP 16 | VALVES OPEN: | 520,523,528,536,538 |
| | VALVES SHUT: | 518,519,521,522,524,525,526,527,529, 530,531,532,535,537,539,540,541,542 |
| STEP 17 | VALVES OPEN: | 520,523,528,536,539 |
| | VALVES SHUT: | 518,519,521,522,524,525,526,527,529, 530,531,532,535,537,538,540,541,542 |
| STEP 18 | VALVES OPEN: | 520,523,524,526,528,541 |
| | VALVES SHUT: | 518,519,521,522,525,527,529,530,531, 532,535,536,537,538,539,540,542 |
| STEP 19 | VALVES OPEN: | 520,523,525,529,531,536,538 |
| | VALVES SHUT: | 518,519,521,522,524,526,527,528,530, 532,535,537,539,540,541,542 |
| STEP 20 | VALVES OPEN: | 520,523,525,529,531,536,539 |
| | VALVES SHUT: | 518,519,521,522,524,526,527,528,530, 532,535,537,538,540,541,542 |
| STEP 21 | VALVES OPEN: | 520,523,524,525,529,532,536,539 |
| | VALVES SHUT: | 518,519,521,522,526,527,528,530,531, 535,537,538,540,541,542 |

The separation of the purified gas mixture of carbon monoxide and hydrogen produced in the first stage 500 of the PSA unit shown in FIG. 5 is effected in the second stage 501. The second stage uses three adsorbent vessels 550, 551 and 552 each containing a bed 553 of zeolite molecular sieve which will separate the mixture by preferentially adsorbing the carbon monoxide. Each of the vessels 550, 551 and 552 has at its bottom a gas port 554 and at its top a gas port 555. The gas ports 554 can be selectively placed in communication with the pipeline 511, a carbon monoxide withdrawal pipeline 556 having a vacuum pump 557 disposed therein and terminating in a carbon monoxide collection vessel 558, and a carbon monoxide purge pipeline 559 having a flow control valve 560 disposed therein. Withdrawal of carbon monoxide product from the collection vessel 558 may be made by opening valve 562 in an outlet 563.

The gas ports 555 of the vessels 550, 551 and 552 are able to be selectively placed in communication with the mixer 118 (shown in FIG. 1) whereby hydrogen-enriched gas can be returned to the PSA unit 122 for separation into a hydrogen product. The ports 555 of the vessels 550, 551 and 552 are also able to be selectively placed in communication with the second purge gas pipeline 513 whereby a purge gas comprising carbon monoxide and hydrogen may be supplied to the first stage 500 of the plant shown in FIG. 5.

Various switching valves associated with the ports 554 and 555 determine which pipelines communicate with each of the vessels any time in an operating cycle. Thus, gas ports 554 have switching valves 564, 565 and 566 which, when open, place the respective vessel in communication with pressurized purified gas mixture comprising carbon monoxide and hydrogen from the pipeline 551. The ports 555 are associated with switching valves 567, 568 and 569 which, when open, place the respective vessel in communica- tion with the pipeline 561 whereby unadsorbed gas may be returned to mixer 118 in the apparatus shown in FIG. 1.

The vessels 550, 551 and 552 have, respectively, switching valves 570, 571 and 572 which enable them to be purged the end of the adsorption step. These valves, when opened, permit gas to flow from the carbon monoxide purge pipeline 559 into the respective vessel through gas port 554. In addition, the vessels, respectively, have switching valves 573, 574 and 575 which, when open, permit gas released or purged from the respective vessel to be supplied through the gas port 555 to the pipeline 513 for use in the first stage of the process. In addition, each of the switching valves 576, 577 and 578 permits desorption of carbon monoxide product from the beds 553 by the vacuum pump 557. The desorbed carbon monoxide is withdrawn through ports 554 and passed to the tank 558.

The switching valves are operated by means well known in the art for the production of carbon monoxide product in synchronization with the cycle performed in the first stage 500 of the PSA unit shown in FIG. 5. The vessel 550 is placed in communication through its port 554 with a purified and pressurized hydrogen/carbon monoxide mixture fed by the first stage 500 to the pipeline 511. The bed 553 of adsorbent selectively adsorbs carbon monoxide to form a hydrogen-enriched gas mixture which passes out of the vessel 550 through the port 555 into the hydrogen-enriched gas mixture return pipeline 561. Typically, this adsorption step is continued for a period of about three to four minutes until the adsorbent is fully charged with adsorbed carbon monoxide. The next step is to vent unadsorbed gas consisting mainly of hydrogen to the pipeline 513 through port 555. Venting will generally last from 2 to 30 seconds. Although the pressure in the bed 553 falls significantly during this step, the pressure drop is not sufficient to remove hydrogen completely. The remaining unadsorbed hydrogen is then purged from bed 553 in vessel 550. Accordingly, bed 553 is placed in communication with pipeline 559 to permit carbon monoxide product to flow into vessel 550 through port 554. The resulting mixture of carbon monoxide and hydrogen passes from the vessel 550 into the pipeline 513. Typically, this step takes about three minutes and is continued until only minute traces of hydrogen remain in the vessel 550. Communication between the vessel 550 and the pipelines 513 and 559 is discontinued, vessel 550 is placed in communication with pipeline 556 and carbon monoxide is desorbed from the adsorbent bed by vacuum pump 557 and withdrawn as product. The evacuation of the vessel 550, typically to about 100 Torr, will continue for about three to four minutes until most of the carbon monoxide has been withdrawn therefrom.

While the above described cycle of operations is repeatedly performed using the vessel 550, complementary cycles are performed using the vessels 551 and 552 in appropriate phase relation therewith. The respective phasing of the cycles and the positions of the switching valves required to effect switching from step to step are shown in Tables 7 and 8 below. It is to be appreciated that the steps of the process set out in Tables 7 and 8 correspond to the steps shown in Tables 5 and 6.

TABLE 7

| Step No. | Duration (secs) | Vessel 550 | Vessel 551 | Vessel 552 |
|---|---|---|---|---|
| 1 | 12 | Evacuate/Produce CO product | Purge of pipeline 513 | Adsorb CO |
| 2 | 6 | Evacuate/Produce CO product | Purge of pipeline 513 | Adsorb CO |
| 3 | 34 | Evacuate/Produce CO product | Purge of pipeline 513 | Adsorb CO |
| 4 | 60 | Evacuate/Produce CO product | Purge of pipeline 513 | Adsorb CO |
| 5 | 14 | Adsorb CO | Evacuate/Produce CO product | Vent to pipeline 513 |
| 6 | 12 | Adsorb CO | Evacuate/Produce CO product | Vent to pipeline 513 |
| 7 | 72 | Adsorb CO | Evacuate/Produce CO product | Purge to pipeline 513 |
| 8 | 12 | Adsorb CO | Evacuate/Produce CO product | Purge to pipeline 513 |
| 9 | 6 | Adsorb CO | Evacuate/Produce CO product | Purge to pipeline 513 |
| 10 | 34 | Adsorb CO | Evacuate/Produce CO product | Purge to pipeline 513 |
| 11 | 60 | Adsorb CO | Evacuate/Produce CO product | Purge to pipeline 513 |
| 12 | 14 | Vent to pipeline 513 | Adsorb CO | Evacuate/Produce CO product |
| 13 | 12 | Vent to pipeline 513 | Adsorb CO | Evacuate/Produce CO product |
| 14 | 72 | Purge to pipeline 513 | Adsorb CO | Evacuate/Produce CO product |
| 15 | 12 | Purge to pipeline 513 | Adsorb CO | Evacuate/Produce CO product |
| 16 | 6 | Purge to pipeline 513 | Adsorb CO | Evacuate/Produce CO product |
| 17 | 34 | Purge to pipeline 513 | Adsorb CO | Evacuate/Produce CO product |
| 18 | 60 | Purge to pipeline 513 | Adsorb CO | Evacuate/Produce CO product |
| 19 | 14 | Evacuate/Produce CO product | Vent to pipeline 531 | Adsorb CO |
| 20 | 12 | Evacuate/Produce CO product | Vent to pipeline 531 | Adsorb CO |
| 21 | 72 | Evacuate/Produce CO product | Vent to pipeline 531 | Adsorb CO |

TABLE 8

| | | |
|---|---|---|
| STEP 1 | VALVES OPEN: | 566,569,571,574,576 |
| | VALVES SHUT: | 564,565,567,568,570,572,573,575,577,578 |
| STEP 2 | VALVES OPEN: | 566,569,571,574,576 |
| | VALVES SHUT: | 564,565,567,568,570,572,573,575,577,578 |
| STEP 3 | VALVES OPEN: | 566,569,571,574,576 |
| | VALVES SHUT: | 564,565,567,568,570,572,573,575,577,578 |
| STEP 4 | VALVES OPEN: | 566,569,571,574,576 |
| | VALVES SHUT: | 564,565,567,568,570,572,573,575,577,578 |
| STEP 5 | VALVES OPEN: | 564,567,575,577 |
| | VALVES SHUT: | 565,566,568,569,570,571,572,573,574,576,578 |
| STEP 6 | VALVES OPEN: | 564,567,575,577 |
| | VALVES SHUT: | 565,566,568,569,570,571,572,573,574,576,578 |
| STEP 7 | VALVES OPEN: | 564,567,572,575,577 |
| | VALVES SHUT: | 565,566,568,569,570,571,573,574,576,578 |
| STEP 8 | VALVES OPEN: | 564,567,572,575,577 |
| | VALVES SHUT: | 565,566,568,569,570,571,573,574,576,578 |
| STEP 9 | VALVES OPEN: | 564,567,572,575,577 |
| | VALVES SHUT: | 565,566,568,569,570,571,573,574,576,578 |
| STEP 10 | VALVES OPEN: | 564,567,572,575,577 |
| | VALVES SHUT: | 565,566,568,569,570,571,573,574,576,578 |
| STEP 11 | VALVES OPEN: | 564,567,572,575,577 |
| | VALVES SHUT: | 565,566,568,569,570,571,573,574,576,578 |
| STEP 12 | VALVES OPEN: | 565,568,573,578 |
| | VALVES SHUT: | 564,566,567,569,570,571,572,574,575,576,577 |
| STEP 13 | VALVES OPEN: | 565,568,573,578 |
| | VALVES SHUT: | 564,566,567,569,570,571,572,574,575,576,577 |
| STEP 14 | VALVES OPEN: | 565,568,570,573,578 |
| | VALVES SHUT: | 564,566,567,569,571,572,574,575,576,577 |
| STEP 15 | VALVES OPEN: | 565,568,570,573,578 |
| | VALVES SHUT: | 564,566,567,569,571,572,574,575,576,577 |
| STEP 16 | VALVES OPEN: | 565,568,570,573,578 |
| | VALVES SHUT: | 564,566,567,569,571,572,574,575,576,577 |
| STEP 17 | VALVES OPEN: | 565,568,570,573,578 |
| | VALVES SHUT: | 564,566,567,569,571,572,574,575,576,577 |
| STEP 18 | VALVES OPEN: | 565,568,570,573,578 |
| | VALVES SHUT: | 564,566,567,569,571,572,574,575,576,577 |
| STEP 19 | VALVES OPEN: | 566,569,574,576 |
| | VALVES SHUT: | 564,565,567,568,570,571,572,573,575,577,578 |
| STEP 20 | VALVES OPEN: | 566,569,574,576 |
| | VALVES SHUT: | 564,565,567,568,570,571,572,573,575,577,578 |
| STEP 21 | VALVES OPEN: | 566,569,571,574,576 |
| | VALVES SHUT: | 564,565,567,568,570,572,573,575,577,578 |

It is not essential for all the sorptive separation steps of the subject invention to be performed by PSA. In an alternative process, the gas mixture comprising hydrogen, carbon monoxide and carbon dioxide is first subjected to absorptive separation e.g. in ethanolamine solution, to separate a pure carbon dioxide product. A part of the carbon dioxide product is used to reform the hydrocarbon. Such preliminary removal of carbon dioxide from the gas mixture facilitates the subsequent separation of the hydrogen product and facilitates the use of a conventional PSA process for separating hydrogen product and a gas mixture enriched in carbon monoxide as described in U.S. Pat. No. 3,430,418. Such a process is illustrated in FIG. 6.

Figure 6:
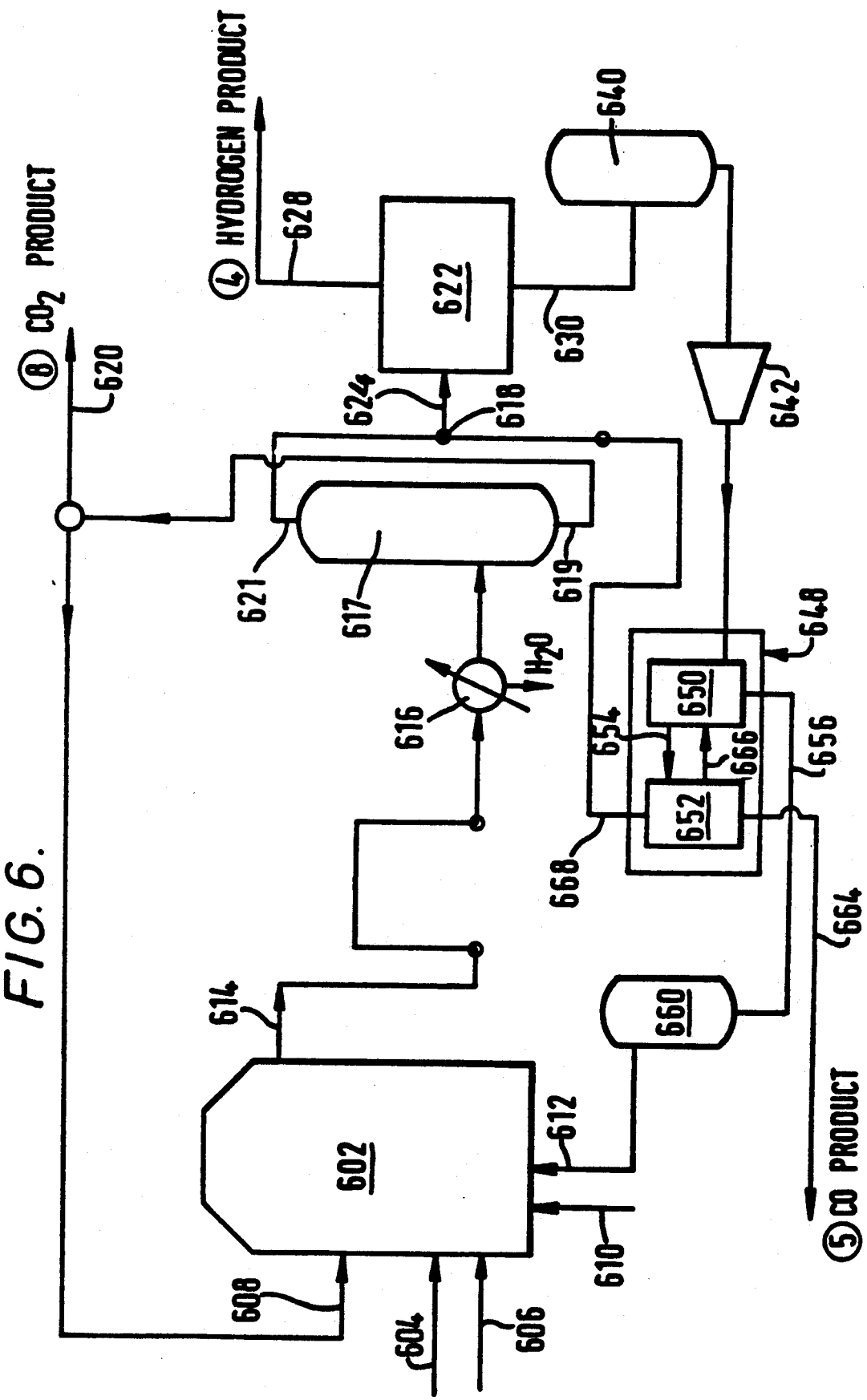
FIG. 6 is a schematic diagram illustrating an alternative apparatus for producing carbon monoxide and hydrogen products including a reformer, a liquid phase separator for producing carbon dioxide, a PSA unit for producing hydrogen, and a PSA unit for producing carbon monoxide.

The apparatus illustrated in FIG. 6 includes a reformer 602 in which hydrocarbon introduced through inlet 604 is reacted with steam introduced through inlet 606 and a recycled carbon dioxide stream introduced through inlet 608. The reformer 602 operates under the same general conditions as that described with reference to FIG. 1.

The effluent from the reformer 602 passes through line 614 and enters cool 616 ni which it is cooled to about ambient temperature, thereby being condensed to separate water producing a gas mixture comprising hydrogen, carbon monoxide, carbon dioxide and methane. This mixture is passed into a carbon dioxide absorption system 617 which employs an organic absorbent liquid, such as ethanolamine, thus providing a pure carbon dioxide product which is withdrawn through outlet 619 and pipeline 620. A portion of the carbon dioxide product is recycled to the inlet 608 of reformer 602. A hydrogen-rich gas mixture also containing carbon monoxide and methane passes out of the absorption system 617 through its outlet 621 and is united in mixer 618, which may merely be a union of two pipes, with another hydrogen-rich gas stream from a downstream part of the apparatus. The resulting gas mixture, typically comprising from about 60 to 85 mole per cent of hydrogen; from about 8 to 40 mole per cent of carbon monoxide and up to about 5 mole per cent of methane, passes through line 624 and enters a PSA separator unit 622 in which it is separated into a pure hydrogen product withdrawn through outlet 628 and carbon monoxide-enriched gas mixture withdrawn through outlet 630 and collected in storage tank 640. The purity of the products of the PSA unit is enhanced by the preliminary removal of carbon dioxide.

The storage tank 640 provides feed gas for the next stage of the process which involves the PSA separation of a substantially pure carbon monoxide product. Thus, a compressor 642 continuously draws a gas mixture enriched in carbon monoxide from the storage tank 640 and raises it to a pressure preferably about 1 atmosphere above that of the inlet pressure of the gas entering the PSA unit 622 and then passes it to a PSA unit 648 comprising a first stage 650 and a second stage 652. In the first stage 650, constituents of the gas mixture more readily adsorbable than carbon monoxide are adsorbed to produce a gas mixture consisting essentially of hydrogen and carbon monoxide which passes out of the first stage 650 through conduit 654 into the second stage 652 for further separation. The adsorbed gas is then desorbed and some of it is vented through an outlet 656, being received in a tank 660 which is employed as a source of fuel for the reformer 602 via line 612. Heat can be provided to reformer 602 by burning hydrocarbon fuel, introduced into reformer 602 via line 610.

In the second stage 652 of the PSA unit 648, carbon monoxide is adsorbed from the gas mixture to produce a gas mixture rich in hydrogen. A part of this gas is passed out of the plant 648 through an outlet 668 and is mixed with a similar mixture leaving absorber system 617. Another portion of the hydrogen-rich gas is returned through conduit 666 to the first stage 650 where it helps to purge desorbed gases from the adsorbent. In order to produce a relatively pure carbon monoxide product from the PSA unit 648, carbon monoxide adsorbed by the second stage adsorbent is desorbed by a vacuum pump (not shown) and is withdrawn through the outlet 664. Typically, the carbon monoxide product contains less than 200 volumes per million of methane, less than 10 volumes per million of carbon dioxide and less than 1500 volumes per million of hydrogen. Apparatus as shown in FIG. 6 is capable of producing carbon monoxide in relatively high yield in comparison with known noncryogenic processes. This is mainly as a result of employing the combination of the absorber system 617 to remove carbon dioxide from the gas mixture produced in the reformer 602, thus facilitating subsequent separation of hydrogen and carbon monoxide. Preferably, a PSA unit as described above with reference to FIG. 5 is used as unit 648 in the apparatus shown in FIG. 6.

In addition to mixtures comprising hydrogen, carbon monoxide and carbon dioxide, the process of this invention is effective to separate other mixtures, such as, for example, an ammonia plant purge gas from which ammonia has been removed. Such a gas mixture typically comprises hydrogen (the first component), argon (the second component), methane (the third component) and nitrogen. Nitrogen is more strongly adsorbed than argon and less strongly adsorbed than methane and, hence, distributes between the gas mixture enriched in argon and the gas mixture enriched in methane. Such a mixture comprises, for example, 61.6% by volume of hydrogen, 20.5% by volume nitrogen, 4.6% by volume argon, and 13.3% by volume methane. The invention is particularly useful in the separation of such a mixture in view of the relatively high commercial value of the second component, argon.

The method and apparatus according to the invention are further illustrated by the following examples.

EXAMPLE 1

Referring to FIG. 1, butane at a temperature of 600° F. and a pressure of 260 psig is fed to the reformer 102 at a dry gas flow rate of 2590 scfh. The unit "scfh" used herein is the flow rate of gas expressed in cubic feet per hour at a temperature of 70° C. and a pressure of 1 atmosphere absolute. The butane is reacted in reformer 102 with steam at a flow rate of 49028 scfh, a temperature of 700° F., and a pressure of 260 psig and with compressed carbon dioxide-enriched gas mixture at a flow rate of 10010 scfh, a temperature of 300° F. and a pressure of 260 psig. Butane fuel fed into the reformer 102 at 20 psig, 75° F. and a flow rate of 1337 scfh is combusted to provide heat for the reforming reactions. Also combusted therein is waste gas supplied from tank 160 at 75° F., 3 psig and a flow rate of 9047 scfh. The reformer effluent flows to the cooler 116 at 1500° F. and 220 psig. Its flow rate is 78045 scfh on a wet gas basis and 43713 scfh on a dry gas basis. The composition of the gas mixture, excluding water, is 61.5 mole per cent of hydrogen, 16.4 mole per cent of carbon monoxide, 1.6 mole per cent of methane and 20.5 mole per cent of carbon dioxide. After removal of substantially all of the water in the cooler 116, the gas mixture is mixed in the mixer 118 with a gas stream from PSA unit 148 to produce a feed for PSA unit 122 comprising, excluding water vapor: 68.9 mole per cent of hydrogen, 13.3 mole per cent of carbon monoxide; 1.3 mole per cent of methane; and 16.5 mole per cent of carbon dioxide. This mixture is fed to PSA unit 122 at 75° F., 205 psig and a dry gas flow rate of 54262 scfh wherein it is separated into a product hydrogen stream containing less than 1 volume per million of carbon monoxide and no measurable traces of methane or carbon dioxide, at a flow rate of 21000 scfh, a temperature of 75° F. and pressure of 200 psig which is introduced into tank 140. There is combined therein a carbon monoxide enriched gas mixture comprising, excluding water vapor: hydrogen—66.0 mole per cent; carbon monoxide—32.5 mole per cent; methane—1.2 mole per cent; and carbon dioxide—0.3 mole per cent. This gas mixture is withdrawn from PSA unit 122 at 75° F., 10 psig and a dry gas flow rate of 18755 scfh.

PSA unit 122 also produces a carbon dioxide-enriched gas mixture at 75° F., 3 to 5 psig and a flow rate of 14507 scfh which is introduced into tank 140. This mixture excluding water vapor, comprises: hydrogen—27.6 mole per cent; carbon monoxide 7.7 mole per cent; methane—3.3 mole per cent, and carbon dioxide 61.4 mole per cent. The carbon monoxide-enriched gas mixture is withdrawn from the tank 140 by the compressor 142 at the same average rate as it entered the tank 140 and is separated in PSA unit 148 to produce a carbon monoxide product at 75° F. and a flow rate of 3656 scfh. The carbon monoxide product contains less than 1500 vpm of hydrogen, less than 200 vpm of methane, and less than 10 vpm of carbon dioxide. The PSA unit 148 also produces a hydrogen-rich gas stream which is mixed with cooled gas from the reformer 102 and introduced into PSA unit 122. The carbon dioxide-enriched effluent from PSA unit 122, which by-passes tank 136, is combined with a similar stream 156 produced by the first stage 150 of PSA unit 148. The resulting gas mixture comprises, excluding water vapor: hydrogen—34.5 mole per cent; carbon monoxide—30.2 mole per cent; methane—4.2 mole per cent., and carbon dioxide 31.1 mole per cent and constitutes the waste gas fuel 112 for the reformer 102.

EXAMPLE 2

Referring now to FIG. 6, butane is fed to reformer 602 at 600° F., 260 psig and a flow rate of 2590 scfh. The butane is reacted in the reformer 602 with steam supplied at 700° F., 260 psig and a flow rate of 49028 scfh and a stream of carbon dioxide, produced in the absorption system 617, which is returned to the reformer 602 at 300° F., 260 psig and a flow rate of 8546 scfh. Butane fuel supplied at 75° F., 30 psig and a flow rate of 1005 scfh, is combusted to provide heat for the reforming reactions with a waste gas stream supplied at 75° F., 3 psig and a flow rate of 10035 scfh.

There is withdrawn from the reformer 602 a gas mixture at a flow rate of 76500 scfh, 220 psig, and a temperature of 1500° F. This gas mixture has a dry flow rate of 41352 scfh and comprises: 56.2 mole per cent of hydrogen; 17.2 mole per cent of carbon monoxide; 1.1 mole per cent of methane; and 25.5 mole per cent of carbon dioxide. After removal of water in cooler 616, the gas mixture is passed into the absorption system 617 to remove a stream of carbon dioxide, a portion of which is recycled to the reformer 602 and the remainder taken as product through outlet 620. The absorption system 617 also produces a carbon dioxide-free stream which is mixed with a hydrogen-enriched stream from a downstream stage of the process and fed to PSA unit 622 for separation into a carbon monoxide-enriched gas mixture, withdrawn at 75° F., 200 psig and a flow rate of 16742 scfh. The hydrogen product contains no measurable traces of methane and carbon dioxide and less than 1 volume per million of carbon monoxide. The carbon monoxide-enriched gas mixture is fed to the storage tank 640 from which it is withdrawn, compressed in the compressor 642 and fed to the PSA unit for separation into a carbon monoxide product, a hydrogen-rich gas stream which is mixed with the carbon dioxide-free gas stream leaving absorber 617, and a waste gas stream which is passed to tank 660. The carbon monoxide product withdrawn at 75° F., 25 psig and a rate of 4052 scfh contains less than 1500 vpm of hydrogen, less than 200 vpm of methane, and less than 10 vpm of carbon dioxide. The hydrogen-rich gas mixture is withdrawn through the outlet 668 and the waste gas is withdrawn through the outlet 656. The waste gas, excluding water vapor, comprises: 64.8 mole per cent of hydrogen; 30.5 mole per cent of carbon monoxide; and 4.7 mole per cent of methane.

EXAMPLE 3

This example illustrates the use of the PSA process and apparatus described with reference to FIGS. 2 and 3 to separate an ammonia synthesis plant purge gas, after ammonia removal, into a hydrogen-rich gas fraction, an argon-enriched gas fraction and a methane-enriched gas fraction. The ammonia purge gas, available at −10° F., 1900 psig and a flow rate of approximately 540,000 scfh comprises, by volume, 60.5% of hydrogen, 20% of nitrogen, 4.5% of argon, 13% of methane and 2% of ammonia. This purge gas is expanded to 450 psia, scrubbed with water to remove all of the ammonia and dried.

The resulting feed gas enters the pipeline 220 in FIG. 2. The entire packed bed portion of the first and second adsorptive regions in FIG. 2 comprising vessels 202, 204, 206, 208, 212, 214, 216 and 218, are filled with a type 5A or similar zeolite molecular sieve. Methane is the most strongly adsorbed component on this sieve material followed by nitrogen, argon and hydrogen. The PSA process steps described with reference to FIG. 2 are performed to separate the feed gas into three gas fractions: a hydrogen-rich first fraction, flowing at approximately 250,909 scfh, 415 psia and 75° F., comprising 99.1% hydrogen and 0.45% each of argon and nitrogen; an argon-enriched second gas fraction, flow rate of 110,767 scfh, 70 psia, comprising 41.2% of hydrogen, 16.5% of argon, 39.2% of nitrogen and 3.1% of methane; and a methane-enriched gas third fraction, 168,143 scfh, 25 psia and at 75° F. comprising 19.4% of hydrogen, 2.9% of argon, 38.0% of nitrogen and 39.7% of methane. Although the hydrogen product in this particular example is 99.1%, it is noted that, if desired, this product can be produced as pure as 99.999% hydrogen.

The percent of argon in the feed gas to the PSA system that is recovered in the argon-enriched product is approximately 75%. The advantage of the system described in FIG. 2 in this application over a conventional hydrogen PSA system is that, in addition to a desired purity hydrogen product, it also provides an argon-enriched product which can be purified to pure argon economically in comparison to other sources containing argon.

EXAMPLE 4

Since the commercial value of argon is very high, it is advantageous to maximize argon recovered in the argon-enriched gas fraction. The process and apparatus described with reference to FIG. 3 provides an alternate method for separating ammonia-free, dry, ammonia synthesis plant purge gas into three gas fractions and increasing the percent of argon recovered in the argon-enriched fraction to nearly 85%.

Utilizing the same adsorbent vessel packing as in Example 3 and the process steps described by referring to FIG. 3, the feed gas is separated into three fractions. The hydrogen-rich first gas fraction comprising 99.1% of hydrogen and 0.45% each of argon and nitrogen has a flow rate of 243,468 scfh at 415 psia and 75° F. The argon-enriched second gas fraction has a flow rate of 144,613 scfh, approximately 70 psia and 75° F. and comprises 40.6% of hydrogen, 14.3% of argon, 41.3% of nitrogen and 3.8% of methane. The methane-rich third gas fraction has a flow rate of fraction is 193,819 scfh, 25 psia and 75° F. and comprises of 18.5% of hydrogen, 1.8% of argon, 33.8% of nitrogen and 45.9% of methane. A portion of the methane-rich gas stream equal to 52,900 scfh is compressed to a pressure of at least 275 psia and admitted into the first adsorptive region through pipeline 302 and any one of valves 306, 308, 310 or 312 while the argon-enriched product is removed from the second adsorptive regions through the valves 322, 324, 326 or 328, respectively, as described in the detailed process steps with reference to FIG. 3.

We claim:

1. A process of separating a gas mixture comprising at least three components into three different fractions by pressure swing adsorption, comprising repeatedly performing a cycle including: passing said gas mixture sequentially through first and second adsorptive regions on each of which a second component of the mixture is more strongly adsorbed than a first component, but less strongly adsorbed than a third component; withdrawing a first fraction enriched in said first component from the downstream end of the second adsorptive region; stopping admission of the said gas mixture to the first adsorptive region; withdrawing a second fraction enriched in the second component from the downstream end of the first adsorptive region and from the upstream end of the second adsorptive region into a common pipeline; and withdrawing a third fraction enriched in the third component from the upstream end of the first adsorptive region.

2. A process in accordance with claim 1, wherein said cycles use at least two pairs of said first and second regions, each pair performing the cycle of operations in chosen phase relationship with the others and wherein intermediate the steps of producing the first and second fractions, the pressures in a pair of the first and second regions are equalized with the pressures in another of the pairs of first and second adsorptive regions.

3. A method of separating a gas mixture comprising at least three components into three different fractions by pressure swing adsorption, comprising repeatedly performing a cycle including: passing said gas mixture sequentially through first and second adsorptive regions on each of which a second component of the mixture is more strongly adsorbed than a first component but less strongly adsorbed than a third component; withdrawing a first fraction enriched in said first component from the downstream end of the second region; stopping introduction of the gas mixture to the first adsorptive region and closing the second adsorptive region to the first adsorptive region; withdrawing a second fraction enriched in said second component first from the upstream end of the second adsorptive region while passing gas mixture enriched in said third component into said first adsorptive region from its upstream end, and then from the downstream end of the first adsorptive region; and withdrawing a third enriched in said third component from the feed end of the first adsorptive region.

4. A process in accordance with claim 3, wherein said cycles use at least two pairs of said first and second regions, each pair performing the cycle of operations in chosen phase relationship with the others and wherein intermediate the steps of producing the first and second fractions, the pressures in a pair of the first and second regions are equalized with the pressures in another of the pairs of first and second adsorptive regions.

5. A process in accordance with claim 3, wherein the first component is hydrogen, the second component is argon, and the third component is methane.

6. A process of separating a feed gas mixture comprising at least three components by pressure swing adsorption comprising repeatedly performing a cycle including the steps of: (a) passing the gas mixture under pressure through at least one adsorptive bed wherein one or more of the components thereof is more strongly adsorbed than one or more of the remaining components which are continuously discharged therefrom at a first location; and (b) reversing the flow through the adsorptive bed thereby desorbing the adsorbed components therefrom at a second location, wherein a flow of a gas mixture comprising two or more components of continuously varying concentration withdrawn from the adsorptive bed during either of said steps, is collected in two fractions from said first location, in two fractions from said second location or in two fractions from said first location and two fractions from said second location in timed relationship such that the first fraction is enriched in one or more components relative to the second fraction and the second fraction is enriched in one or more components relative to the first fraction.

7. A process in accordance with claim 6, wherein said feed gas mixture comprises hydrogen, carbon monoxide and carbon dioxide, the gas mixture withdrawn during step (b) comprises carbon monoxide and carbon dioxide, and said first and second fractions are relatively enriched in carbon dioxide and carbon monoxide, respectively.

8. A process in accordance with claim 6, wherein the feed gas mixture comprises hydrogen, argon and methane, said gas mixture withdrawn during step (a) comprises hydrogen and argon and said first and second fractions are relatively enriched in hydrogen and argon, respectively.

* * * * *